(12) United States Patent
Meade

(10) Patent No.: US 12,442,980 B2
(45) Date of Patent: Oct. 14, 2025

(54) PLANAR FIBER SHUFFLE

(71) Applicant: Ayar Labs, Inc., Santa Clara, CA (US)

(72) Inventor: Roy Edward Meade, Lafayette, CA (US)

(73) Assignee: Ayar Labs, Inc., San Jose, CA (US)

( * ) Notice: Subject to any disclaimer, the term of this patent is extended or adjusted under 35 U.S.C. 154(b) by 584 days.

(21) Appl. No.: 17/531,678

(22) Filed: Nov. 19, 2021

(65) Prior Publication Data

US 2022/0163723 A1    May 26, 2022

Related U.S. Application Data

(60) Provisional application No. 63/117,456, filed on Nov. 24, 2020.

(51) Int. Cl.
| | |
|---|---|
| G02B 6/26 | (2006.01) |
| G02B 6/28 | (2006.01) |
| G02B 6/36 | (2006.01) |
| H04B 10/25 | (2013.01) |

(52) U.S. Cl.
CPC ............ *G02B 6/26* (2013.01); *G02B 6/28* (2013.01); *G02B 6/3608* (2013.01); *H04B 10/25* (2013.01)

(58) Field of Classification Search
CPC ........ G02B 6/3608; G02B 6/28; G02B 6/354; G02B 6/356; G02B 6/43
See application file for complete search history.

(56) References Cited

U.S. PATENT DOCUMENTS

| | | | | |
|---|---|---|---|---|
| 6,343,171 | B1 * | 1/2002 | Yoshimura | H01L 23/5389 |
| | | | | 385/24 |
| 6,390,690 | B1 * | 5/2002 | Meis | G02B 6/3897 |
| | | | | 385/88 |
| 9,551,845 | B1 | 1/2017 | Kim | |
| 9,995,881 | B1 * | 6/2018 | Patel | G02B 6/122 |
| 10,107,967 | B1 * | 10/2018 | Butler | G02B 6/3612 |
| 2006/0215954 | A1 * | 9/2006 | Jenkins | G02B 6/3596 |
| | | | | 385/18 |
| 2013/0308904 | A1 | 11/2013 | McGinnis et al. | |
| 2013/0308944 | A1 | 11/2013 | Schwetman, Jr. et al. | |
| 2015/0378095 | A1 | 12/2015 | Hsu et al. | |
| 2016/0334575 | A1 * | 11/2016 | Graves | G02B 6/126 |

(Continued)

OTHER PUBLICATIONS

International Application No. PCT/US21/60218, International Search Report and Written Opinion of the International Searching Authority, Feb. 3, 2022.

(Continued)

*Primary Examiner* — Eric Wong
(74) *Attorney, Agent, or Firm* — Penilla IP, APC

(57) ABSTRACT

A multi-MCP (multi-chip package) module assembly includes a plate, an integrated optical fiber shuffle disposed on the plate, a first MCP disposed on the plate, a second MCP disposed on the plate, a first optical fiber jumper disposed on the plate, and a second optical fiber jumper disposed on the plate. The first optical fiber jumper optically connects the first MCP to the integrated optical fiber shuffle. The second optical fiber jumper optically connects the second MCP to the integrated optical fiber shuffle. The integrated optical fiber shuffle includes an optical network configured to direct optical signals to and from each of the first optical fiber jumper and the second optical fiber jumper.

18 Claims, 19 Drawing Sheets

(56) References Cited

U.S. PATENT DOCUMENTS

| | | |
|---|---|---|
| 2016/0359568 A1* | 12/2016 | De Dobbelaere .... H01R 25/006 |
| 2019/0086618 A1 | 3/2019 | Shastri et al. |
| 2019/0094460 A1 | 3/2019 | Brusberg et al. |
| 2019/0170945 A1* | 6/2019 | Fortusini .................. G02B 6/13 |
| 2020/0068706 A1 | 2/2020 | Daghighian et al. |

OTHER PUBLICATIONS

Barwicz, Tymon, et al. "A Novel Approach to Photonic Packaging Leveraging Existing High-Throughput Microelectronic Facilities." IEEE Journal of Selected Topics in Quantum Electronics, vol. 22, No. 6, Nov. 2016.

* cited by examiner (View A-A)

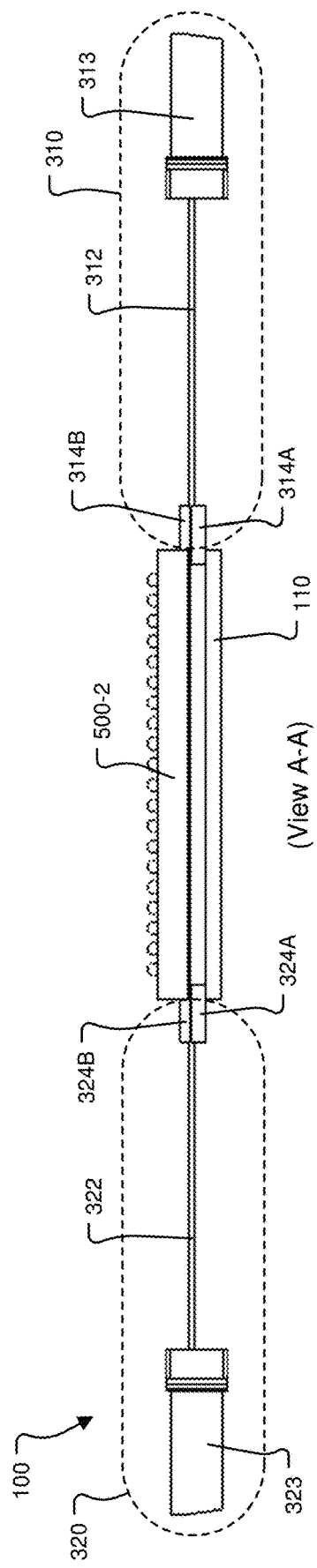
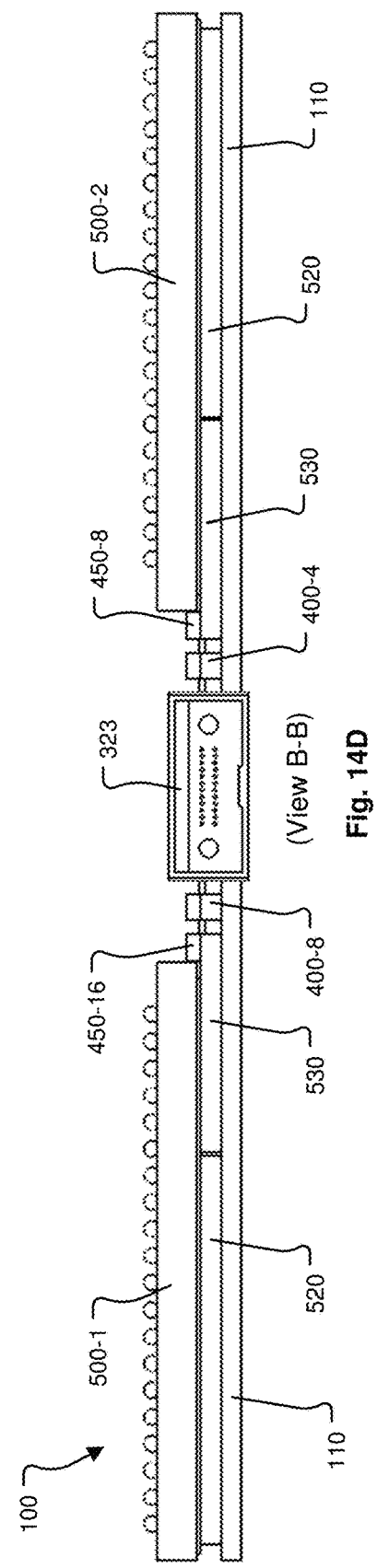

PLANAR FIBER SHUFFLE

CLAIM OF PRIORITY

This application claims priority under 35 U.S.C. 119(e) to U.S. Provisional Patent Application No. 63/117,456, filed on Nov. 24, 2020, the disclosure of which is incorporated herein by reference in its entirety for all purposes.

BACKGROUND

1. Field of the Invention

The present invention relates to optical data communication.

2. Description of the Related Art

Optical data communication systems operate by modulating laser light to encode digital data patterns. The modulated laser light is transmitted through an optical data network from a sending node to a receiving node. The modulated laser light having arrived at the receiving node is de-modulated to obtain the original digital data patterns. Therefore, implementation and operation of optical data communication systems is dependent upon having reliable and efficient devices for modulating optical signals and for receiving optical signals. It is within this context that the present invention arises.

SUMMARY

In an example embodiment, a multi-MCP (multi-chip package) module assembly is disclosed. The multi-MCP module assembly includes a plate, an integrated optical fiber shuffle disposed on the plate, a first MCP disposed on the plate, a second MCP disposed on the plate, a first optical fiber jumper disposed on the plate, and a second optical fiber jumper disposed on the plate. The first optical fiber jumper optically connects the first MCP to the integrated optical fiber shuffle. The second optical fiber jumper optically connects the second MCP to the integrated optical fiber shuffle.

In an example embodiment, a method is disclosed for optical data communication. The method includes transmitting a light signal through a first optical fiber to an optical network within an integrated optical fiber shuffle. The first optical fiber is optically connected to the integrated optical fiber shuffle. The method also includes directing the light signal through the optical network to a second optical fiber. The second optical fiber is optically connected to the integrated optical fiber shuffle. The method also includes directing the light signal through the second optical fiber to an optical waveguide within an MCP. The second optical fiber is optically connected to the MCP.

Other aspects and advantages of the invention will become more apparent from the following detailed description, taken in conjunction with the accompanying drawings, illustrating by way of example the present invention.

BRIEF DESCRIPTION OF THE DRAWINGS

FIG. 14C shows a side view of the multi-MCP module assembly, referenced as View A-A in FIG. 14B, in accordance with some embodiments.

FIG. 14D shows an end view of the multi-MCP module assembly, referenced as View B-B in FIG. 14B, in accordance with some embodiments.

DETAILED DESCRIPTION

In the following description, numerous specific details are set forth in order to provide an understanding of the present invention. It will be apparent, however, to one skilled in the art that the present invention may be practiced without some or all of these specific details. In other instances, well known process operations have not been described in detail in order not to unnecessarily obscure the present invention.

Embodiments are disclosed herein for an integrated optical fiber shuffle to enable integration of multiple photonic die and/or multi-chip packages (MCP's) into a larger multi-MCP module. In some embodiments, the integrated optical fiber shuffle is a planar optical fiber shuffle. In some embodiments, the planar optical fiber shuffle is implemented as a planar lightwave circuit (PLC). In some embodiments, use of the integrated optical fiber shuffle to create the larger multi-MCP module that includes multiple photonic die and/or MCP's includes use of optical fiber-to-chip technology for silicon photonics, such as IOSMF (input/output single mode fiber). In some embodiments, use of the integrated optical fiber shuffle in the form of the PLC, as disclosed herein, avoids having to use an external optical fiber shuffle (external to the larger multi-MCP module that includes the multiple photonic die and/or MCP's). Also, various embodiments disclosed herein incorporate an optical fiber array and optical waveguide distribution system by using a PLC as an optical routing component to the final larger multi-MCP module assembly. Various embodiments disclosed herein also utilize v-groove optical fiber alignment technology. Use of the integrated optical fiber shuffle to create the larger multi-MCP module that includes multiple photonic die and/or MCP's leverages the existing semiconductor ecosystem, while concurrently allowing each photonic die and/or MCP to be tested (yielded). Therefore, use of the integrated optical fiber shuffle, as disclosed herein, provides an approach for managing yield (and hence cost) of the final larger multi-MCP module assembly. Also, the integrated optical fiber shuffle disclosed herein combines photonic components and electronic components to achieve a more compact assembly of multiple photonic die and/or MCP's.

Figure 1:
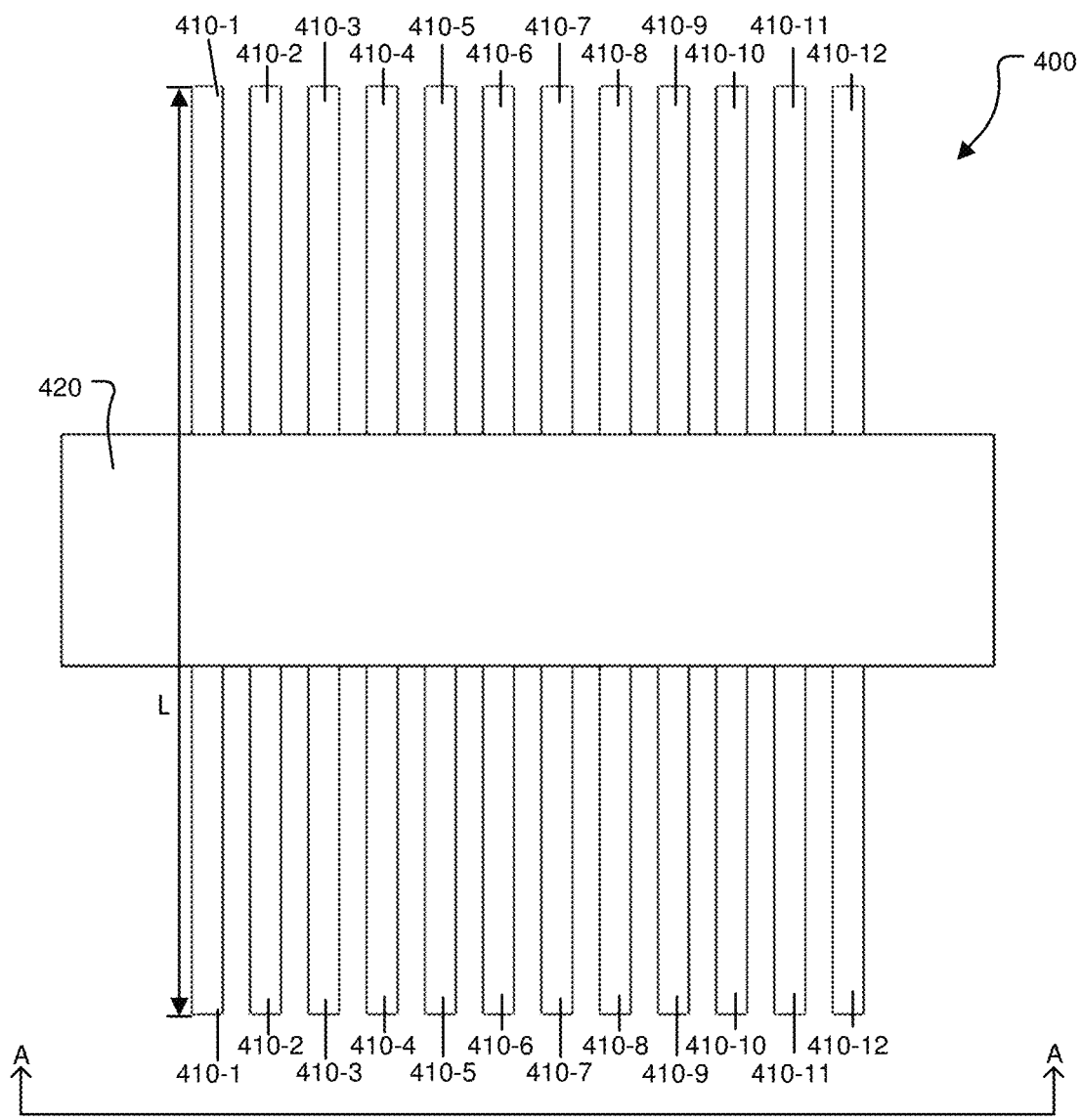
FIG. 1 shows an optical fiber jumper, in accordance with some embodiments.

FIG. 1 shows an optical fiber jumper 400, in accordance with some embodiments. The optical fiber jumper 400 includes a plurality of optical fibers 410-1 to 410-12. The optical fibers 410-1 to 410-12 can be of any type, such as single mode, polarization maintaining, among other types. In some embodiments, a cladding outer diameter of the optical fibers 410-1 to 410-12 is about 125 micrometers. In some embodiments, the cladding outer diameter of the optical fibers 410-1 to 410-12 is about 80 micrometers. In some embodiments, the cladding outer diameter of the optical fibers 410-1 to 410-12 is a size other than 80 micrometers or 125 micrometers. In some embodiments, the optical fibers 410-1 to 410-12 are compatible with optical fiber alignment structures, such as the optical fiber alignment structure arrays 220-229 shown in FIG. 4 and the optical fiber alignment structure arrays 531, 532, 536, 537 shown in FIG. 5. In some embodiments, the optical fiber alignment structures are configured as v-groove structures. Also, the plurality of optical fibers 410-1 to 410-12 are constrained by a cover slip 420. Each of the optical fibers 410-1 to 410-12 has a length L that spans a distance between and across separate optical fiber-to-chip alignment structure arrays. For example, in some embodiments, the length L is defined so that each optical fiber 410-1 to 410-12 extends over a first optical fiber alignment structure array on a photonic chip/die (or MCP), and over a distance between the photonic chip/die (or MCP) and an integrated optical fiber shuffle device, and over a second optical fiber alignment structure array on the integrated optical fiber shuffle device. In some embodiments, the optical fiber jumper 400 is implemented to optically connect the photonic chip/die (or MCP) with the integrated optical fiber shuffle device by disposing a first portion of the optical fibers 410-1 to 410-12 present on a first side of the cover slip 420 in the optical fiber alignment structure array on the photonic chip/die (or MCP) and by disposing a second portion of the optical fibers 410-1 to 410-12 present on a second side of the cover slip 420 in the optical fiber alignment structure array on the integrated optical fiber shuffle device, with the cover slip 420 positioned between the photonic chip/die (or MCP) and the integrated optical fiber shuffle device, such as shown by the optical fiber jumpers 400-1 to 400-8 in FIG. 10.

Figure 2:
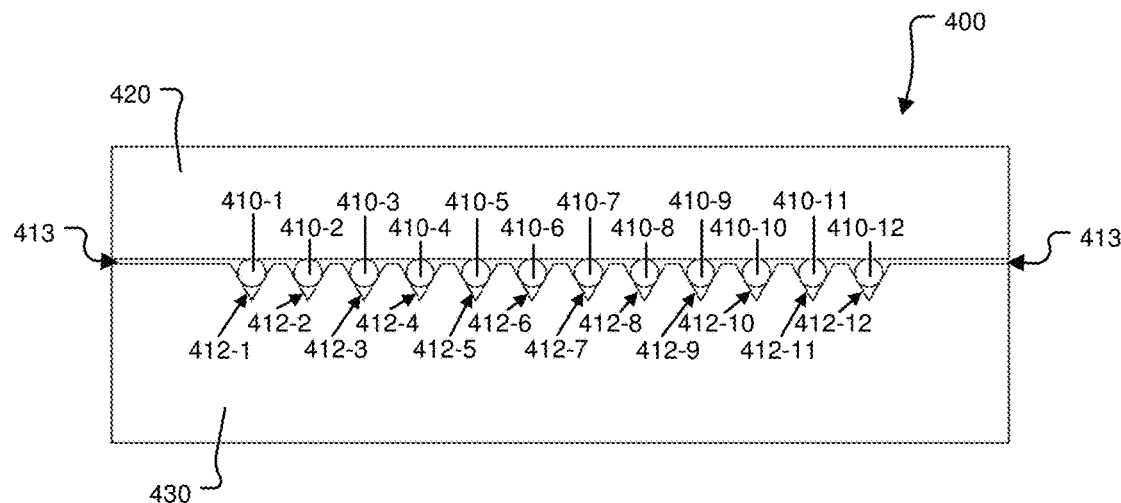
FIG. 2 shows a side view of the optical fiber jumper, referenced as View A-A in FIG. 1, in accordance with some embodiments.

FIG. 2 shows a side view of the optical fiber jumper 400, referenced as View A-A in FIG. 1, in accordance with some embodiments. The optical fiber jumper 400 includes an optical fiber alignment structure array 430. The cover slip 420 is disposed over the optical fiber alignment structure array 430, with the optical fibers 410-1 to 410-12 positioned between the optical fiber alignment structure array 430 and the cover slip 420. The optical fiber alignment structure array 430 is configured to align the optical fibers 410-1 to 410-12. In some embodiments, the optical fiber alignment structure array 430 is configured as a v-groove array that includes v-grooves 412-1 to 412-12, where each of the v-grooves is configured to receive a corresponding one of the optical fibers 410-1 to 410-12. In some embodiments, the optical fiber jumper 400 is fabricated, aligned, and handled as a unit. In some embodiments, the optical fiber alignment structure array 430 and the cover slip 420 are formed of one or more of silicon, silicon dioxide, and metal, or of another suitable material. In some embodiments, the optical fiber alignment structure array 430 and the cover slip 420 are bonded together by an adhesive 413, such as epoxy or other suitable adhesive material, with the optical fibers 410-1 to 410-12 positioned between the optical fiber alignment structure array 430 and the cover slip 420. In some embodiments, the adhesive 413 is disposed between the optical fiber alignment structure array 430 and the cover slip 420. In some embodiments, the adhesive 413 is disposed between the optical fiber alignment structure array 430 and the cover slip 420 and around the optical fibers 410-1 to 410-12 outside of the area in which the v-grooves 412-1 to 412-12 are formed. In some embodiments, the adhesive 413 is disposed between the optical fiber alignment structure array 430 and the cover slip 420 and over the optical fibers 410-1 to 410-12 disposed within the v-grooves 412-1 to 412-12.

Figure 3:
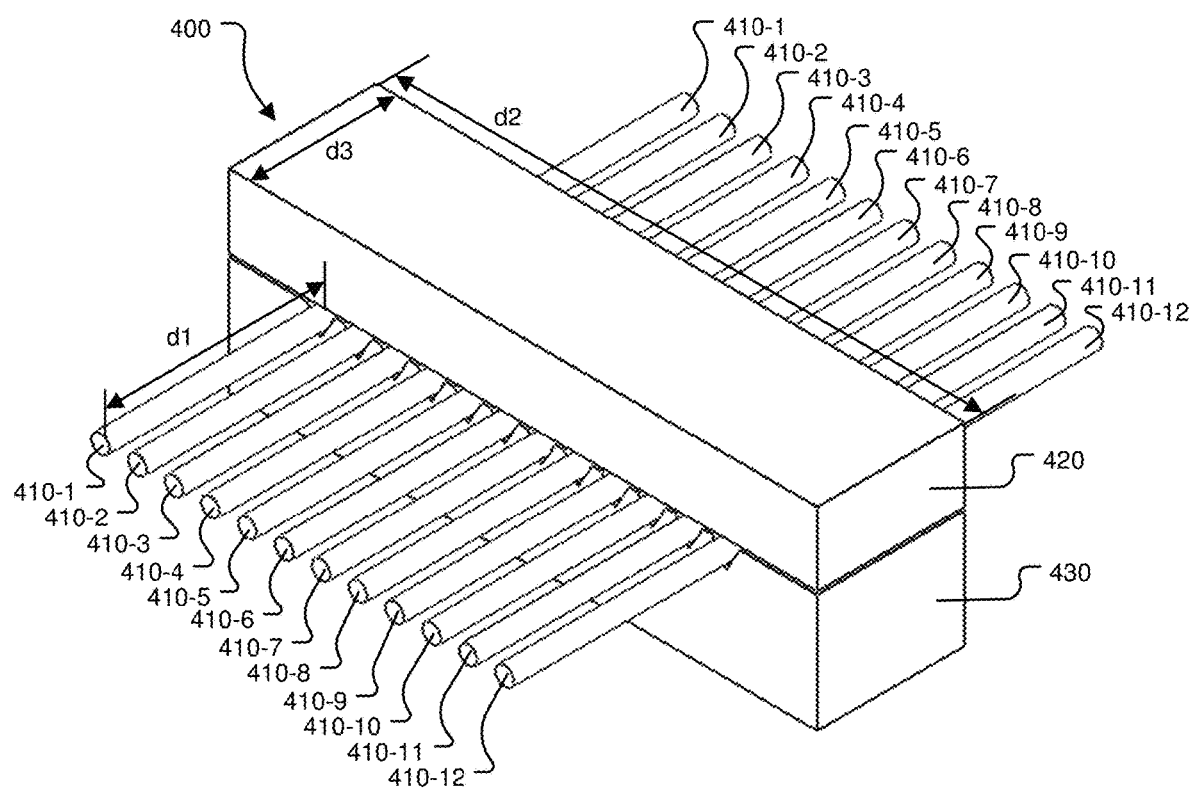
FIG. 3 shows an isometric view of the optical fiber jumper of FIG. 1, in accordance with some embodiments.

FIG. 3 shows an isometric view of the optical fiber jumper 400, in accordance with some embodiments. In various embodiments, the dimensions of the optical fiber jumper 400 are set as needed. In some embodiments, the optical fiber jumper 400 includes 12 optical fibers 410-1 to 410-12 formed so that each optical fiber 410-1 to 410-12 extends outward from each side of the optical fiber alignment structure array 430 by a distance d1. In some embodiments, the distance d1 is about 2 millimeters (mm). However, in other embodiments, the distance d1 is either less than or greater than about 2 mm. In some embodiments, the optical fiber jumper 400 has a length d2 and a width d3. In some embodiments, the length d2 is about 4 mm. However, in other embodiments, the length d2 is either less than or greater than about 4 mm. In some embodiments, the width d3 is about 1 mm. However, in other embodiments, the width d3 is either less than or greater than about 1 mm. In some embodiments, the optical fiber jumper 400 includes less than 12 optical fibers. In some embodiments, the optical fiber jumper 400 includes more than 12 optical fibers.

Figure 4A:
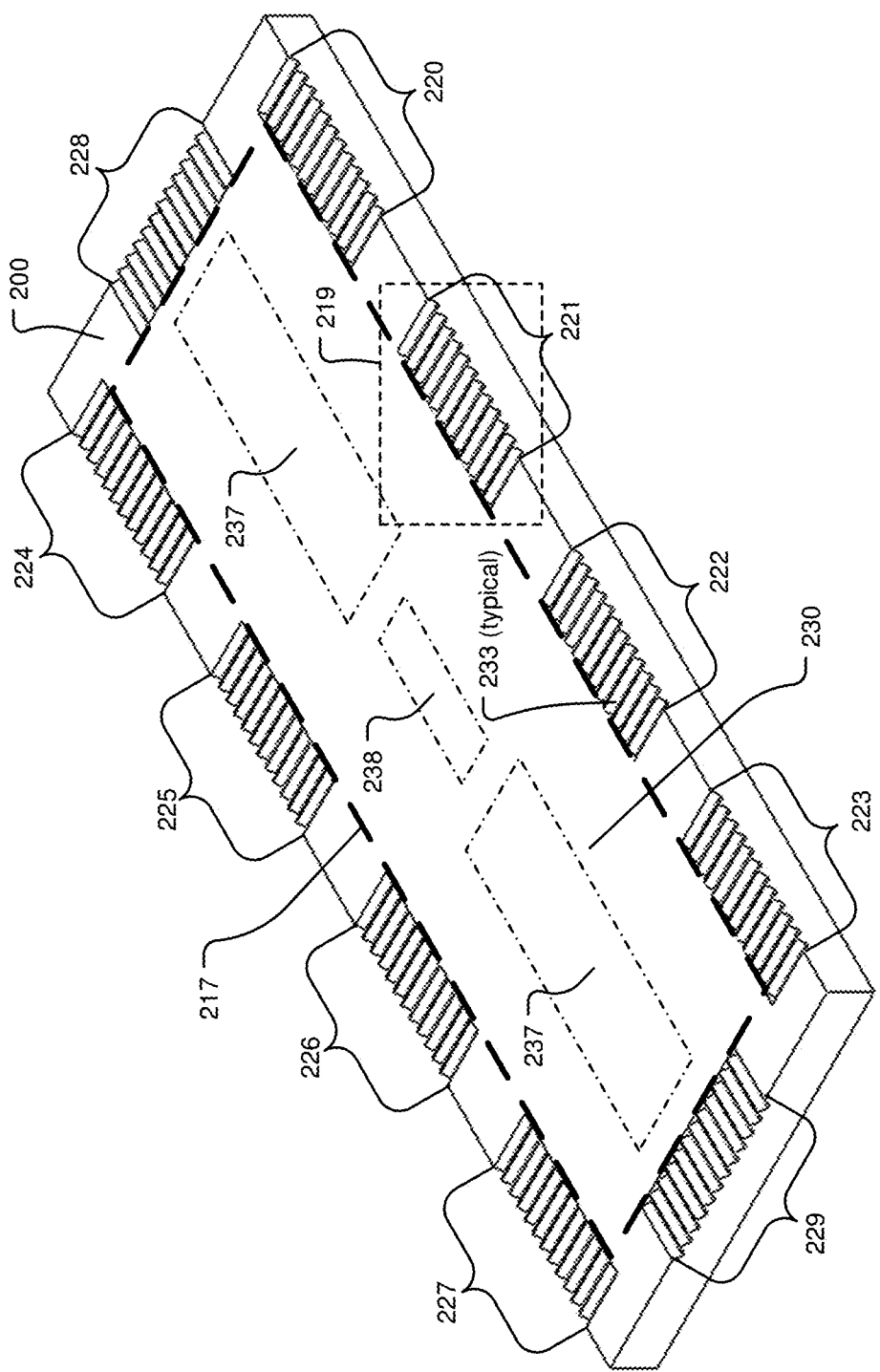
FIG. 4A shows an integrated optical fiber shuffle configured as a planar lightwave circuit, in accordance with some embodiments.

FIG. 4A shows an integrated optical fiber shuffle 200 configured as a PLC, in accordance with some embodiments. The integrated optical fiber shuffle 200 includes multiple optical fiber alignment structure arrays 220 to 229. The integrated optical fiber shuffle 200 includes an optical network 230 formed within the region bounded by the dashed line 217. The optical network 230 is configured to route light from one or more optical fibers positioned within the optical fiber alignment structure arrays 220 to 229 to another one or more optical fibers positioned within the optical fiber alignment structure arrays 220 to 229. In some embodiments, each of the optical fiber alignment structure arrays 220 to 229 is configured as a v-groove array that includes multiple v-grooves 233, where each v-groove 233 is configured to align the core of an optical fiber with an optical coupling device, e.g., an optical grating coupler or optical waveguide, formed within the integrated optical fiber shuffle 200.

Figure 4B:
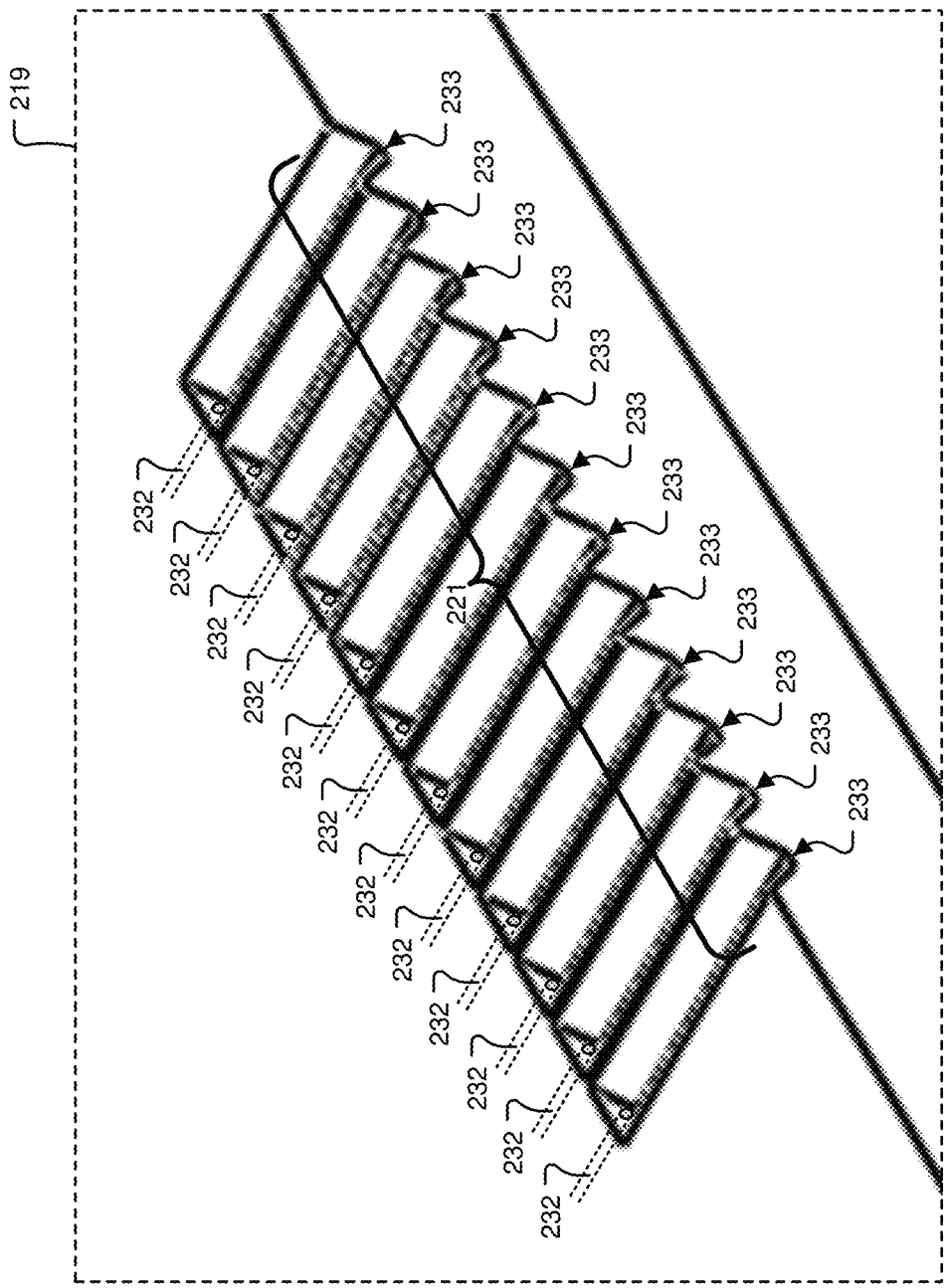
FIG. 4B shows a close-up view of a region of the integrated optical fiber shuffle, as referenced in FIG. 4A, in accordance with some embodiments.

FIG. 4B shows a close-up view of a region 219 of the integrated optical fiber shuffle 200, as referenced in FIG. 4A, in accordance with some embodiments. In some embodiments, one or more of the optical fiber alignment structure arrays 220 to 229 is configured to receive and align cores of multiple optical fibers to respective optical waveguides 232 formed within the integrated optical fiber shuffle 200 to provide for in-plane (edge-type) optical coupling of the multiple optical fibers to the respective optical waveguides 232 (or optical coupling devices) within the integrated optical fiber shuffle 200. With the in-plane optical coupling, light is directed from the optical fiber toward the optical waveguide 232 within the integrated optical fiber shuffle 200, and vice-versa.

Figure 4C:
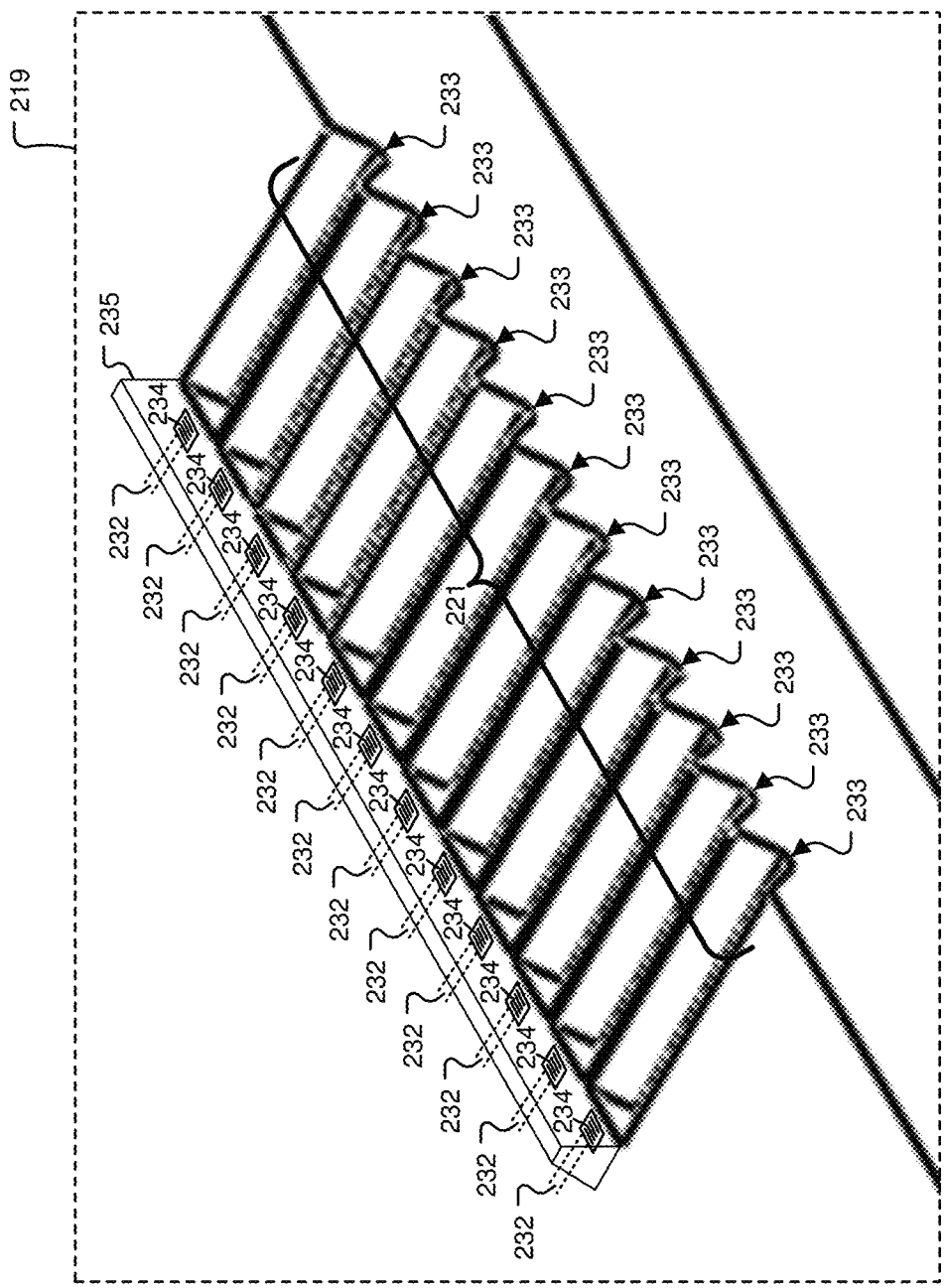
FIG. 4C shows the close-up view region of the integrated optical fiber shuffle in another example embodiment in which one or more of the optical fiber alignment structure arrays is configured to receive and align multiple optical fibers to respective optical grating couplers formed within the integrated optical fiber shuffle to provide for out-of-plane optical coupling of the multiple optical fibers to the respective optical grating couplers, in accordance with some embodiments.

FIG. 4C shows the region 219 in another example embodiment in which one or more of the optical fiber alignment structure arrays 220 to 229 is configured to receive and align multiple optical fibers to respective optical grating couplers 234 formed within the integrated optical fiber shuffle 200 to provide for out-of-plane optical coupling of the multiple optical fibers to the respective optical grating couplers 234, in accordance with some embodiments. With the out-of-plane optical coupling, light is directed from the optical fiber toward the optical grating coupler 234 within the integrated optical fiber shuffle 200, and vice-versa. The optical grating couplers 234 are respectively optically coupled to the optical waveguides 232 within the integrated optical fiber shuffle 200. In some embodiments, one or more mirrored surfaces and/or optical turning prism(s) 235 are used to direct light from the optical fiber toward the optical grating coupler 234 within the integrated optical fiber shuffle 200, and vice-versa. The optical grating coupler 234 functions to redirect the light into one more optical waveguides 232 within the integrated optical fiber shuffle 200. Similarly, with the out-of-plane optical coupling, the optical grating coupler 234 within the integrated optical fiber shuffle 200 functions to redirect light from the optical waveguide 232 within the integrated optical fiber shuffle 200 into an optical fiber that is positioned within a given one of the v-grooves 233 within the optical fiber alignment structure array 220 to 229.

In some embodiments, the integrated optical fiber shuffle 200 includes an optical network 230 that optically connects one or more optical fibers that is/are coupled to the integrated optical fiber shuffle 200 to one or more other optical fibers that is/are coupled to the integrated optical fiber shuffle 200. In some embodiments, the optical network 230 includes passive optical components 237, such as one or more of an arrayed waveguide (AWG), an echelle grating, a star coupler, and a butterfly network, among others. It should be understood that in various embodiments the passive optical components 237 of the optical network 230 can be formed within any one or more portion(s) of the integrated optical fiber shuffle 200. Also, in some embodiments, the optical network 230 provides a point-to-point (P2P) optical connection between two or more optical fibers that are attached to the integrated optical fiber shuffle 200. In some embodiments, the optical network 230 provides a P2P optical connection between a first optical fiber array attached to one of the optical fiber alignment structure arrays 220 to 229 and a second optical fiber array attached to another of the optical fiber alignment structure arrays 220 to 229. In some embodiments, the integrated optical fiber shuffle 200 is configured to provide optical switching functionality. In these embodiments, the optical network 230 includes active optical components 238, such as Mach Zehnder Interferometers, or optical switches, to provide for optical circuit switching between optical fiber array ports. It should be understood that in various embodiments the active optical components 238 of the optical network 230 can be formed within any one or more portion(s) of the integrated optical fiber shuffle 200. In some embodiments, optical switching functionality is not needed, and the optical network 230 is configured using just the passive optical components 237, so as to simplify design and fabrication of the integrated optical fiber shuffle 200.

Figure 4D:
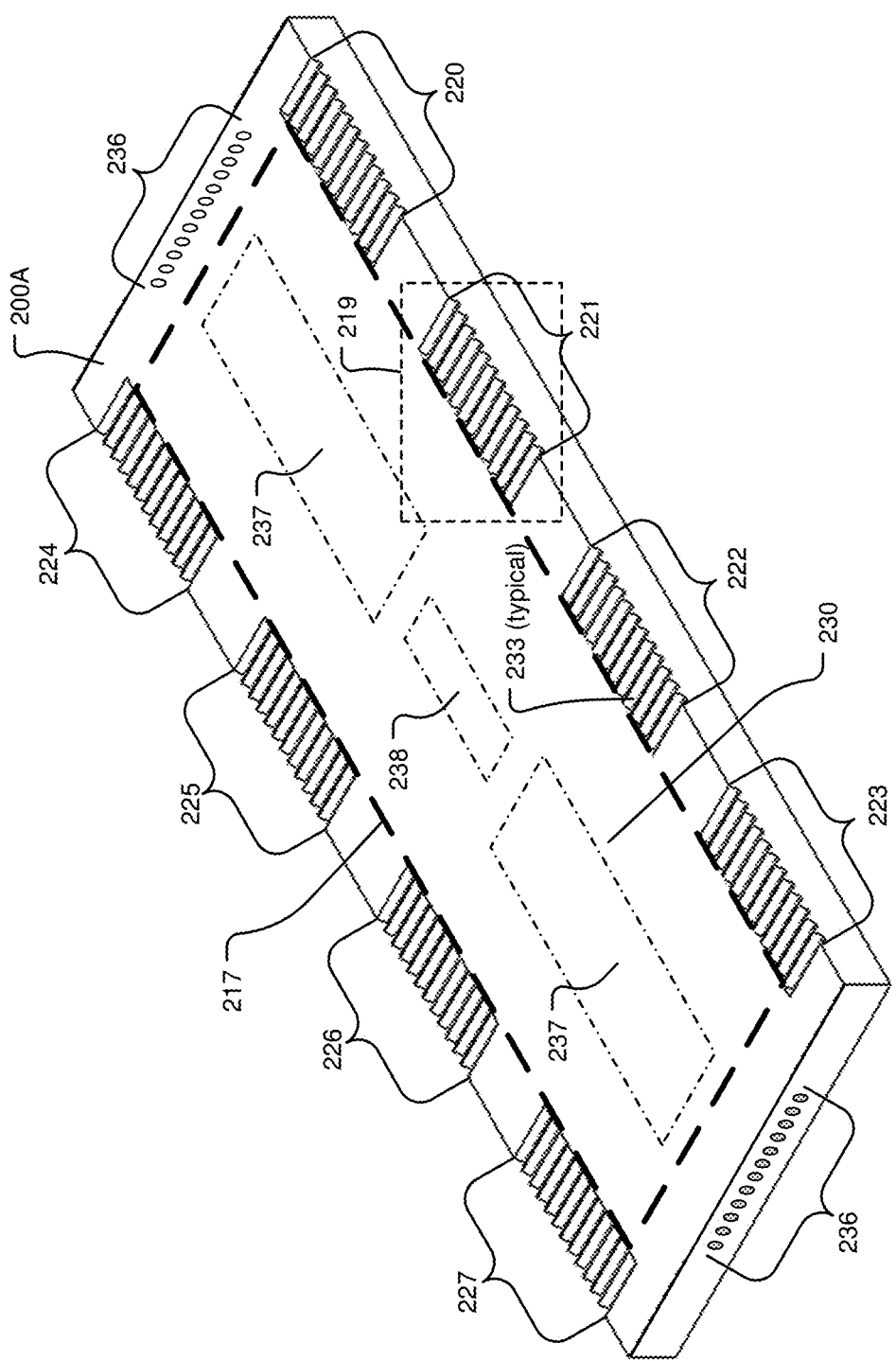
FIG. 4D shows an integrated optical fiber shuffle that includes an array of optical waveguides exposed at each end of the integrated optical fiber shuffle, in accordance with some embodiments.

In some embodiments, the optical fiber alignment structure arrays 228 and 229 at the ends from the integrated optical fiber shuffle 200 are configured as v-groove arrays. However, in some embodiments, rather than having the optical fiber alignment structure arrays 228 and 229 at the ends from the integrated optical fiber shuffle 200, an array of optical waveguides 236 is exposed at each end of the integrated optical fiber shuffle 200. FIG. 4D shows an integrated optical fiber shuffle 200A that includes the array of optical waveguides 236 at each end of the integrated optical fiber shuffle 200A, in accordance with some embodiments. The integrated optical fiber shuffle 200A is a variation of the integrated optical fiber shuffle 200 of FIGS. 4A through 4C. In some embodiments, each end of the integrated optical fiber shuffle 200A is configured to be disposed between a top half and bottom half of an MT ferrule, where the MT ferrule is configured to receive and align optical fibers to the array of optical waveguides 236 exposed at the corresponding end of the integrated optical fiber shuffle 200A. In some embodiments, alignment keys are formed within the integrated optical fiber shuffle 200A to facilitate proper alignment of the top half and bottom half of an MT ferrule with the integrated optical fiber shuffle 200A.

Figure 5:
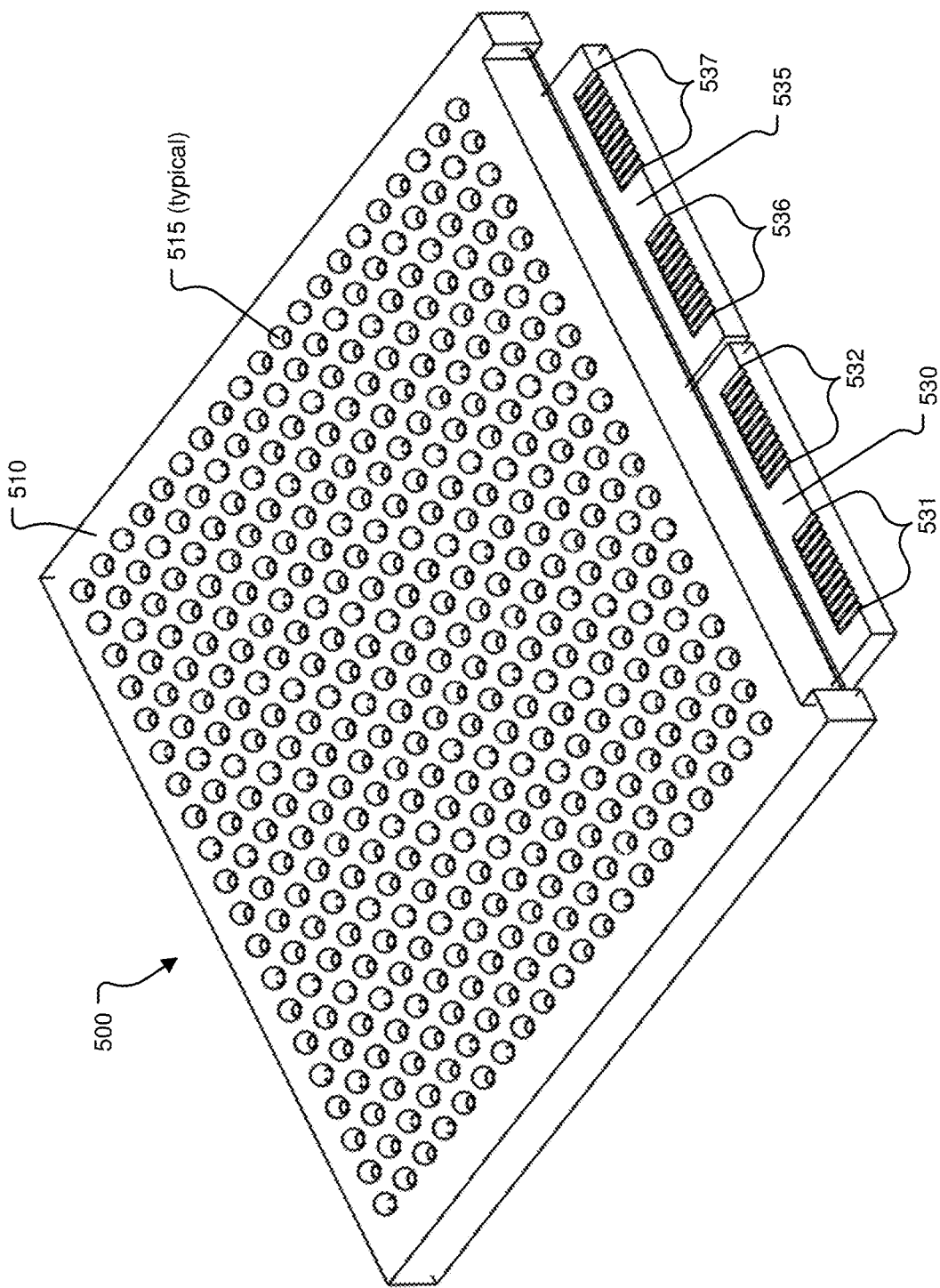
FIG. 5 shows an isometric bottom view of an example MCP, in accordance with some embodiments.

FIG. 5 shows an isometric bottom view of an example MCP 500, in accordance with some embodiments. The bottom side of the MCP 500 is the electrical connection side of the MCP 500. In some embodiments, the bottom side of the MCP 500 includes a ball grid array (BGA) that includes an array of electrically conductive solder balls 515 or similar structures. The solder balls 515 provide for electrical connection of circuitry within the MCP 500 to electrical contacts/circuitry external to the MCP 500. In some embodiments, the MCP 500 includes multiple chips/die 530, 535. In some embodiments, the multiple chips/die 530, 535 are attached to a substrate 510, with the BGA exposed on the bottom side of the substrate 510. In some embodiments, the substrate 510 is an organic substrate. In some embodiments, the substrate 510 is a silicon interposer substrate. In some embodiments, the substrate 510 is an embedded multi-die interconnect bridge (EMIB) substrate. In some embodiments, the substrate 510 is a wafer-level fan-out (WLFO) substrate. It should be understood, however, that in various embodiments, the substrate 510 is essentially any type of substrate that is used in the electronics industry for packaging of semiconductor chips/die.

In some embodiments, such as shown by way of example in FIG. 5, the MCP 500 includes two silicon photonic die 530 and 535. In some embodiments, the silicon photonic die 530 includes at least one optical fiber alignment structure array. In the example embodiment of FIG. 5, the silicon photonic die 530 includes two optical fiber alignment structure array 531 and 532. Also, in some embodiments, the silicon photonic die 535 includes at least one optical fiber alignment structure array. In the example embodiments of FIG. 5, the silicon photonic die 535 includes two optical fiber alignment structure arrays 536 and 537. In some embodiments, each of the optical fiber alignment structure arrays 531, 532, 536, and 537 is configured as a v-groove array. Each of the optical fiber alignment structure arrays 531, 532, 536, and 537 is configured to interface with the optical fiber jumper 400 of FIGS. 1 through 3. It should be understood that the 12 optical fiber configuration of the optical fiber jumper 400 and of the optical fiber alignment structure arrays 531, 532, 536, and 537 is provided by way of example. In other embodiments, the optical fiber jumper 400 and the optical fiber alignment structure arrays 531, 532, 536, and 537 can be configured to accommodate any number of optical fibers that are physically able to fit along the edge of the silicon photonic die 530, 535. For example, in some embodiments, essentially the entire exposed edge of the silicon photonic die 530, 535 is configured as one large optical fiber alignment structure array, e.g., v-groove array. The outer diameter of the optical fibers, e.g., 125 micrometers, 80 micrometers, etc., determines the maximum number of optical fibers that can be connected to the silicon photonic die 530, 535 along the exposed edge of the silicon photonic die 530, 535.

Figure 6:
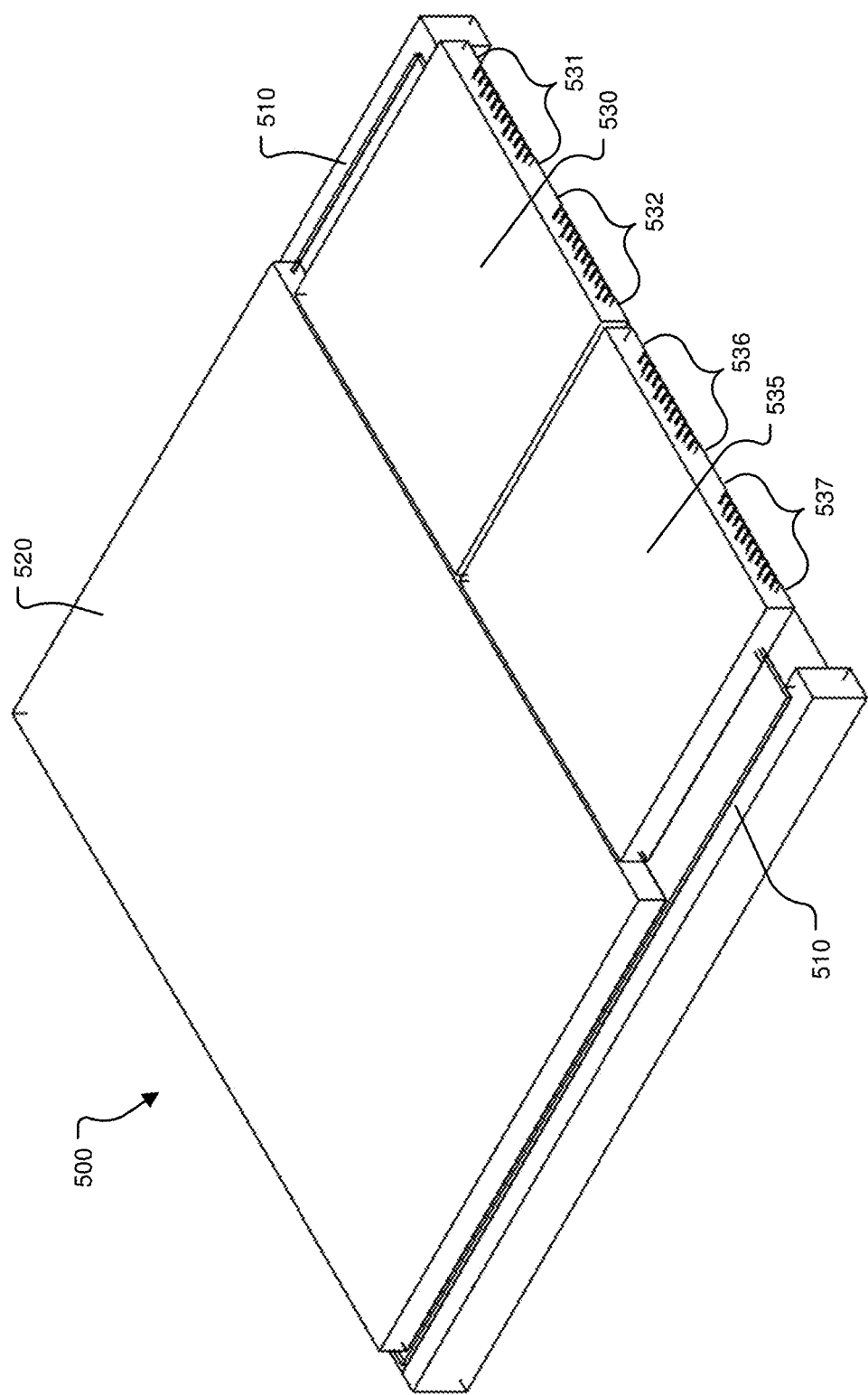
FIG. 6 shows an isometric top view of the example MCP of FIG. 5, in accordance with some embodiments.

FIG. 6 shows an isometric top view of the example MCP 500 of FIG. 5, in accordance with some embodiments. The silicon photonic chips/die 530, 535 are shown attached to the substrate 510. Also, a system-on-chip (SoC) die 520 is shown attached to the substrate 510. In some embodiments, the SoC die 520 is either a field programmable gate array (FPGA) die, a central processing unit (CPU) die, a graphics processing unit (GPU) die, or another type of semiconductor chip/die. Also, in some embodiments, the MCP 500 includes one or more computer memory device(s), such as high bandwidth memory (HBM), and/or one or more other semiconductor chip(s)/die.

Figure 7:
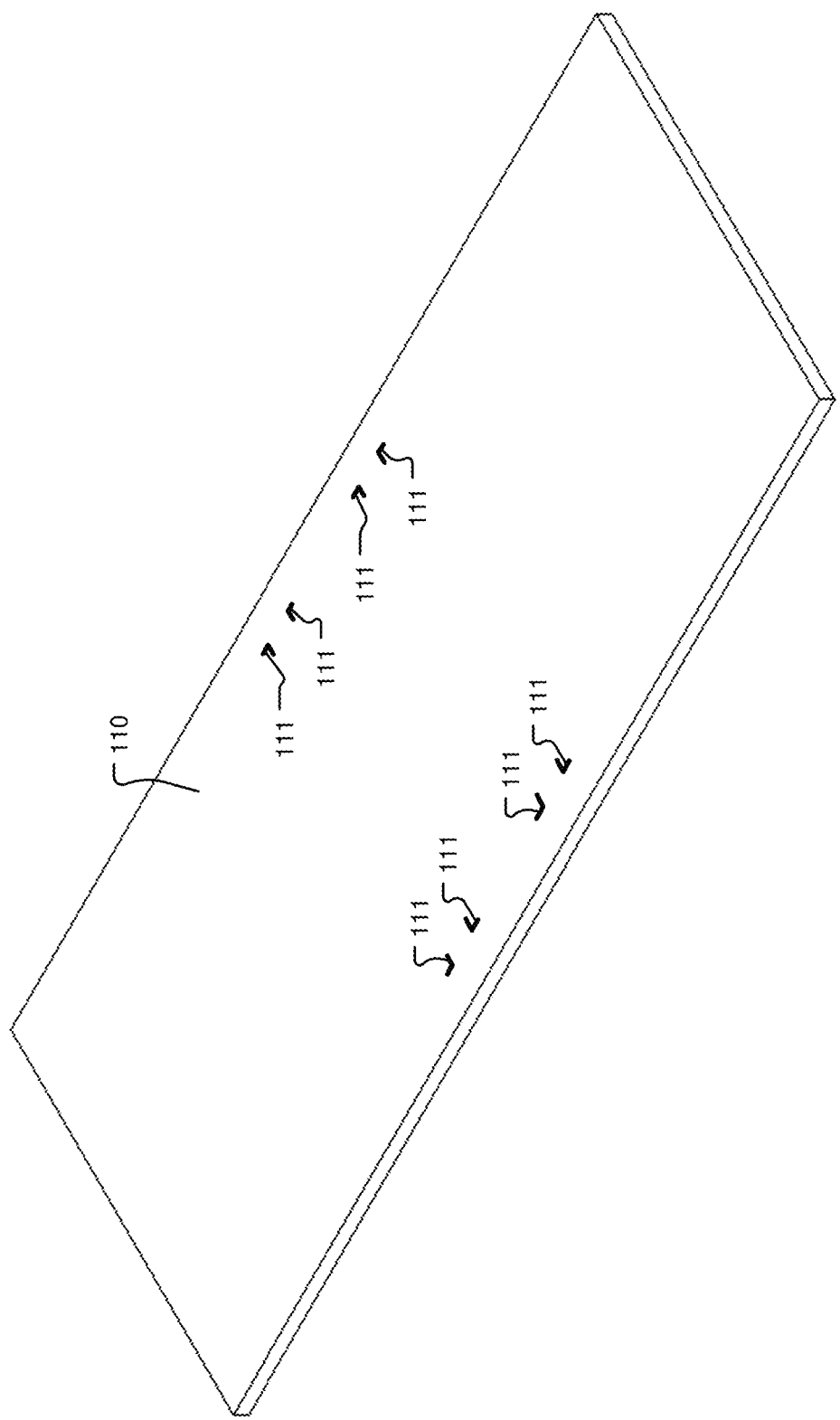
FIG. 7 shows an isometric view of a plate of a multi-MCP module assembly, in accordance with some embodiments.

FIG. 7 shows an isometric view of a plate 110 of a multi-MCP module assembly 100, in accordance with some embodiments. In some embodiments, the plate 110 is a top plate of the multi-MCP module assembly. The plate 110 is also referred to as a frame. The plate 110 provides the datum (reference surface) for the multi-MCP module assembly 100. The plate 110 is formed of a material that has high thermal conductivity and that maintains a high level of planarity. In some embodiments, the plate 110 is formed of a material that has a thermal conductivity greater than or equal to about 0.1 Watt/(centimeter•° C.). In some embodiments, the plate 110 is formed of a material that has a thermal conductivity greater than or equal to about 1 Watt/(centimeter•° C.). In some embodiments, the plate 110 is formed of a material that has a thermal conductivity greater than or equal to about 2 Watt/(centimeter•° C.). In some embodiments, the plate 110 is formed of a material that has a thermal conductivity greater than or equal to about 3 Watt/(centimeter•° C.). In some embodiments, the plate 110 is formed of silicon, alumina, aluminum nitride, silicon carbide, or of one or more metal(s), such as copper, aluminum, nickel plated copper, Kovar alloy, or Alloy 42, tungsten, zinc alloy, among other materials. In some embodiments, fiducials 111 are printed or etched into the plate 110 to assist with subsequent positioning and alignment of devices on the plate 110, such as with positioning and alignment the integrated optical fiber shuffle 200 and multiple instances of the MCP 500 on the plate 110. It should be understood that the fiducials 111 shown in FIG. 7 are provided by way of example. In various embodiments, the fiducials 111 are defined in essentially any manner as appropriate to assist with positioning and alignment of the devices on the plate 110.

Figure 8:
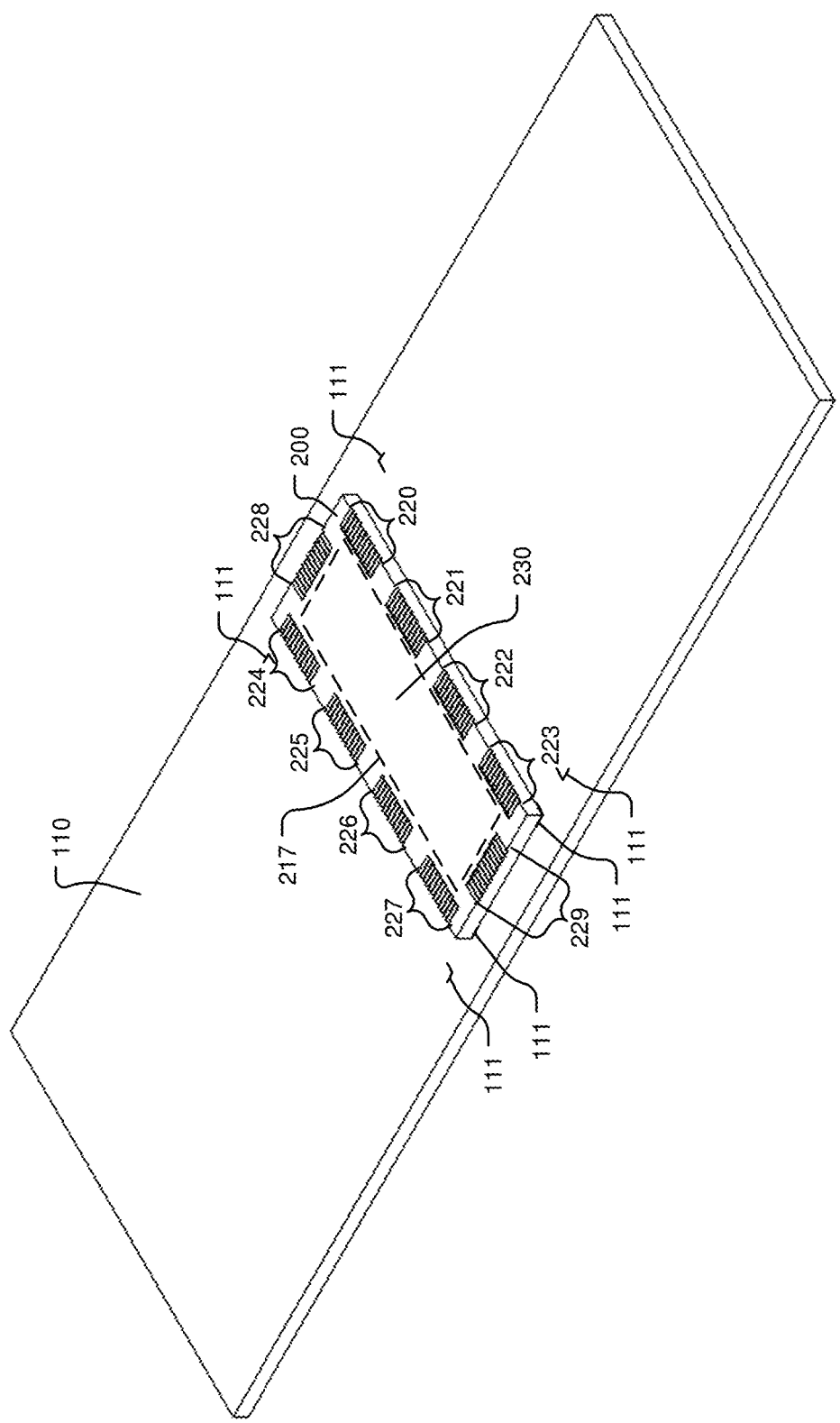
FIG. 8 shows an isometric view of the plate with the integrated optical fiber shuffle positioned and secured to the plate, in accordance with some embodiments.

FIG. 8 shows an isometric view of the plate 110 with the integrated optical fiber shuffle 200 positioned and secured to the plate 110, in accordance with some embodiments. In some embodiments, the integrated optical fiber shuffle 200 is aligned to the fiducials 111 on the plate 110. In some embodiments, the integrated optical fiber shuffle 200 is attached to the plate 110 by a capillary underfill (CUF) process. In some embodiments, the integrated optical fiber shuffle 200 is attached to the plate 110 by a die attach film (DAF). In some embodiments, the integrated optical fiber shuffle 200 is attached to the plate 110 by a non-conductive film (NCF). In some embodiments, the integrated optical fiber shuffle 200 is attached to the plate 110 by a process/material other than CUF, DAF, or NCF. In some embodiments, the integrated optical fiber shuffle 200 is positioned and aligned on the plate 110 to within +/−5 micrometers of a specified target position and alignment. Also, when attached to the plate 110, the integrated optical fiber shuffle 200 is oriented so that the optical fiber alignment structure arrays 220 to 229 face away from the plate 110.

Figure 9:
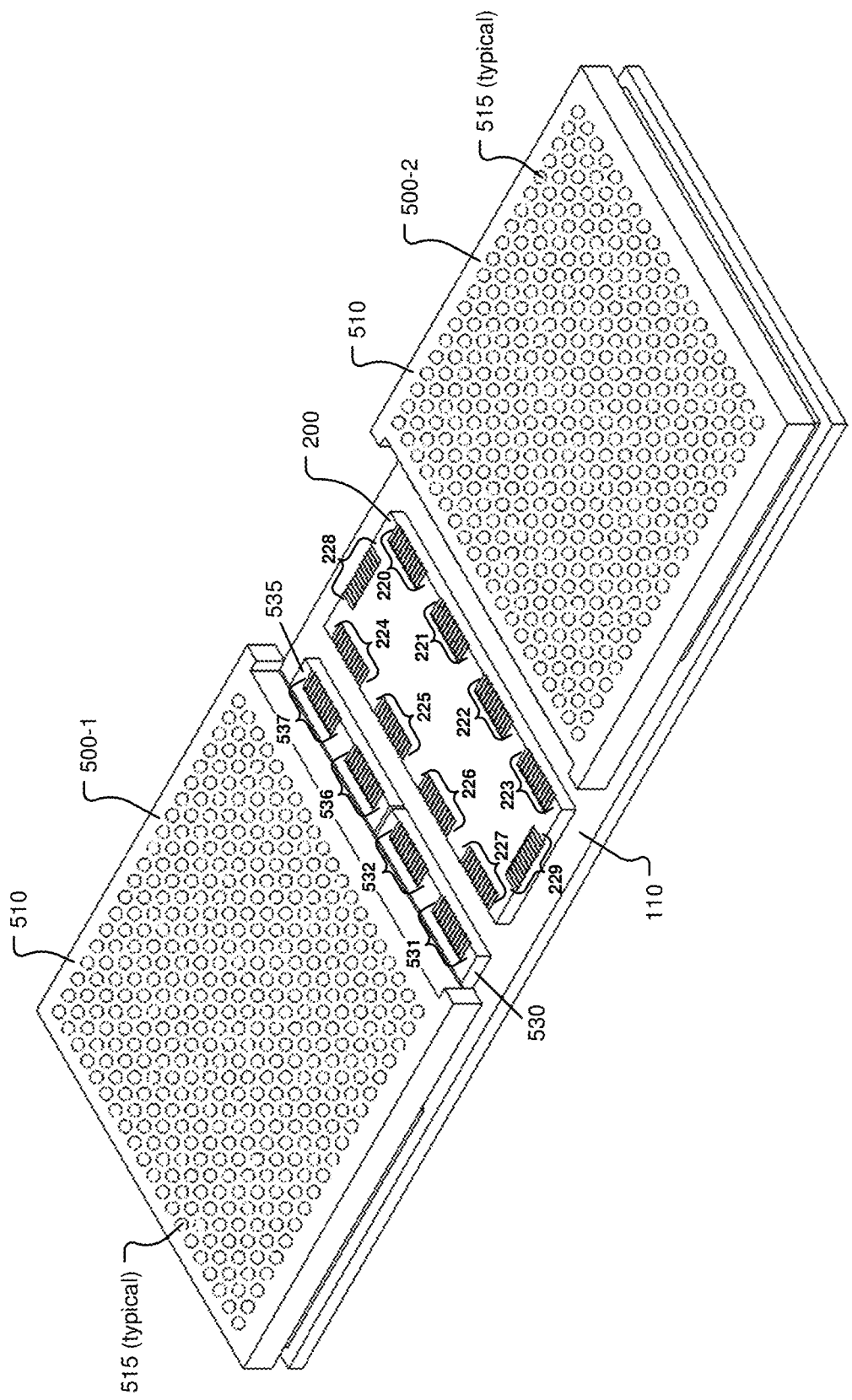
FIG. 9 shows an isometric view of the plate with the integrated optical fiber shuffle positioned and secured to the plate, and with two instances of the MCP positioned and secured to the plate, in accordance with some embodiments.

FIG. 9 shows an isometric view of the plate 110 with the integrated optical fiber shuffle 200 positioned and secured to the plate 110, and with two instances of the MCP 500 (500-1 and 500-2) positioned and secured to the plate 110, in accordance with some embodiments. It should be understood that attachment of two instances of the MCP 500-1 and 500-2 to the plate 110 is provided by way of example. In other embodiments, the MCP's 500-1 and 500-2 can have different configurations with respect to each other. For example, in some embodiments, the MCP 500-1 is a dynamic random access memory (DRAM) MCP, and the MCP 500-2 is a network processor, or vice-versa. It should be understood that in various embodiments, each of the MCP's 500-1 and 500-2 can be any type/configuration of MCP. Each of the MCP's 500-1 and 500-2 is positioned and aligned on the plate 110 so that the optical fiber alignment structure arrays of the MCP's 500-1 and 500-2 are aligned with optical fiber alignment structure arrays 220 to 223 and 224 to 227 of the integrated optical fiber shuffle 200. For example, the MCP 500-1 is positioned and aligned on the plate 110 so that the optical fiber alignment structure arrays 531, 532, 536, and 537 of the MCP 500-1 are respectively aligned with optical fiber alignment structure arrays 227, 226, 225, and 224 of the integrated optical fiber shuffle 200. In some embodiments, the MCP's 500-1 and 500-2 are aligned to the fiducials 111 on the plate 110. In some embodiments, the MCP's 500-1 and 500-2 are aligned directly to the integrated optical fiber shuffle 200.

Figure 10:
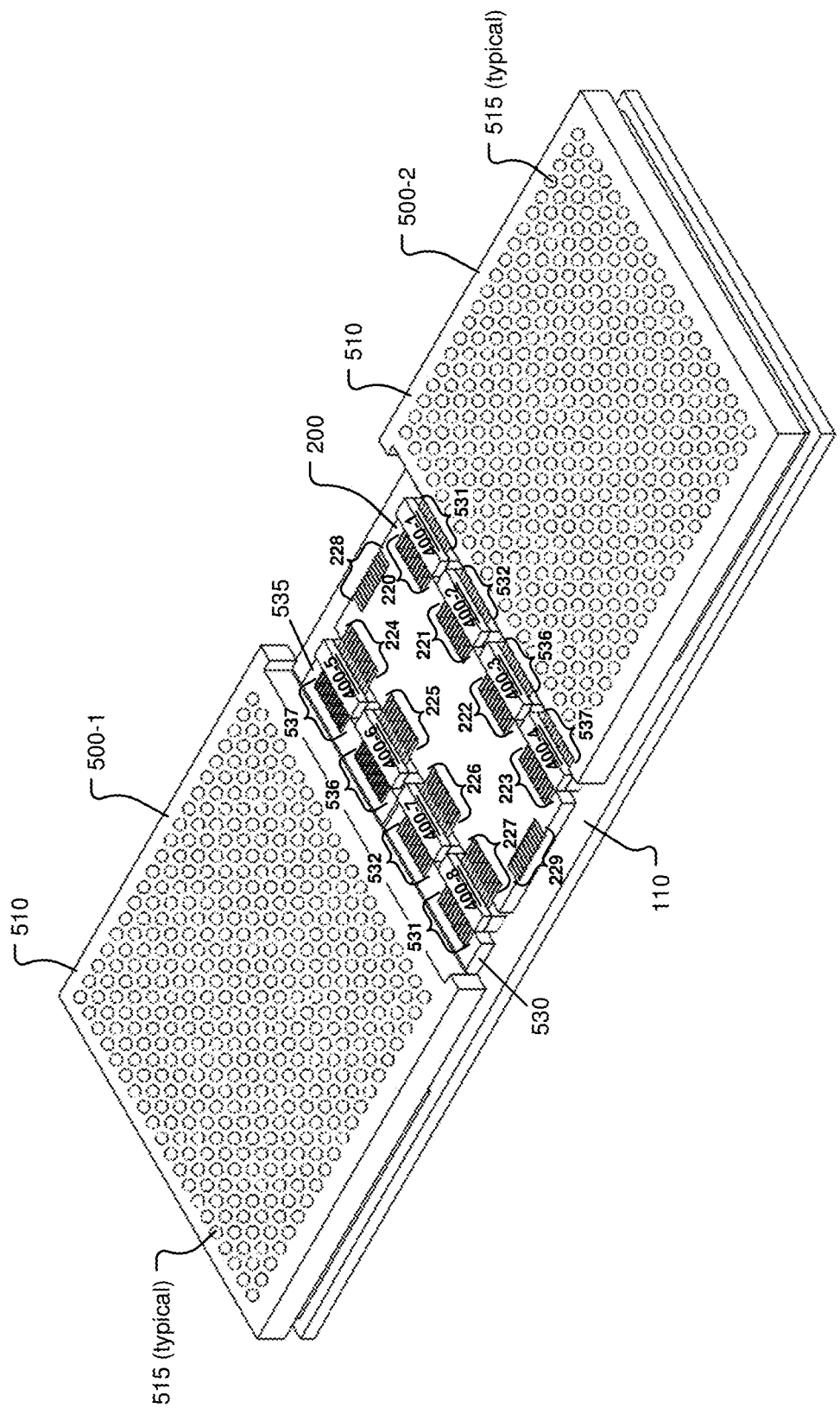
FIG. 10 shows an isometric view of the plate with the integrated optical fiber shuffle positioned and secured to the plate, and with the two MCP's positioned and secured to the plate, and with eight instances of the optical fiber jumper disposed to optically connect the MCP's to the integrated optical fiber shuffle, in accordance with some embodiments.

FIG. 10 shows an isometric view of the plate 110 with the integrated optical fiber shuffle 200 positioned and secured to the plate 110, and with the two MCP's 500-1 and 500-2 positioned and secured to the plate 110, and with eight instances of the optical fiber jumper 400 (400-1 to 400-8) disposed to optically connect the MCP's 500-1 and 500-2 to the integrated optical fiber shuffle 200, in accordance with some embodiments. Each of the optical fiber jumpers 400-1 to 400-8 is disposed within one corresponding optical fiber alignment structure array (one of 220 to 227) on the optical fiber shuffle 200 and within one corresponding optical fiber alignment structure array (one of 531, 532, 536, 537) on the MCP's 500-1 and 500-2. For example, the optical fiber jumper 400-5 is disposed within the optical fiber alignment structure array 224 on the optical fiber shuffle 200 and within the optical fiber alignment structure array 537 on the MCP 500-1. The length L of the optical fibers 410-1 to 410-12 within each of the optical fiber jumpers 400-1 to 400-8 is set so that the optical fibers 410-1 to 410-12 span the distance between the optical fiber shuffle 200 and each of the MCP's 500-1 and 500-2, respectively. In this manner, the optical fiber jumpers 400-1 to 400-4 optically connect the MCP 500-2 to the optical fiber shuffle 200, and the optical fiber jumpers 400-5 to 400-8 optically connect the MCP 500-1 to the optical fiber shuffle 200. In some embodiments, an adhesive material is used to secure the optical fiber jumpers 400-1 to 400-8 to the optical fiber alignment structure arrays 220 to 227 within the optical fiber shuffle 200 and to the optical fiber alignment structure arrays 531, 532, 536, 537 within the MCP's 500-1 and 500-2. In some embodiments, the optical fiber jumpers 400-1 to 400-8 are also secured to the plate 110, such as with an adhesive material/film.

Figure 11:
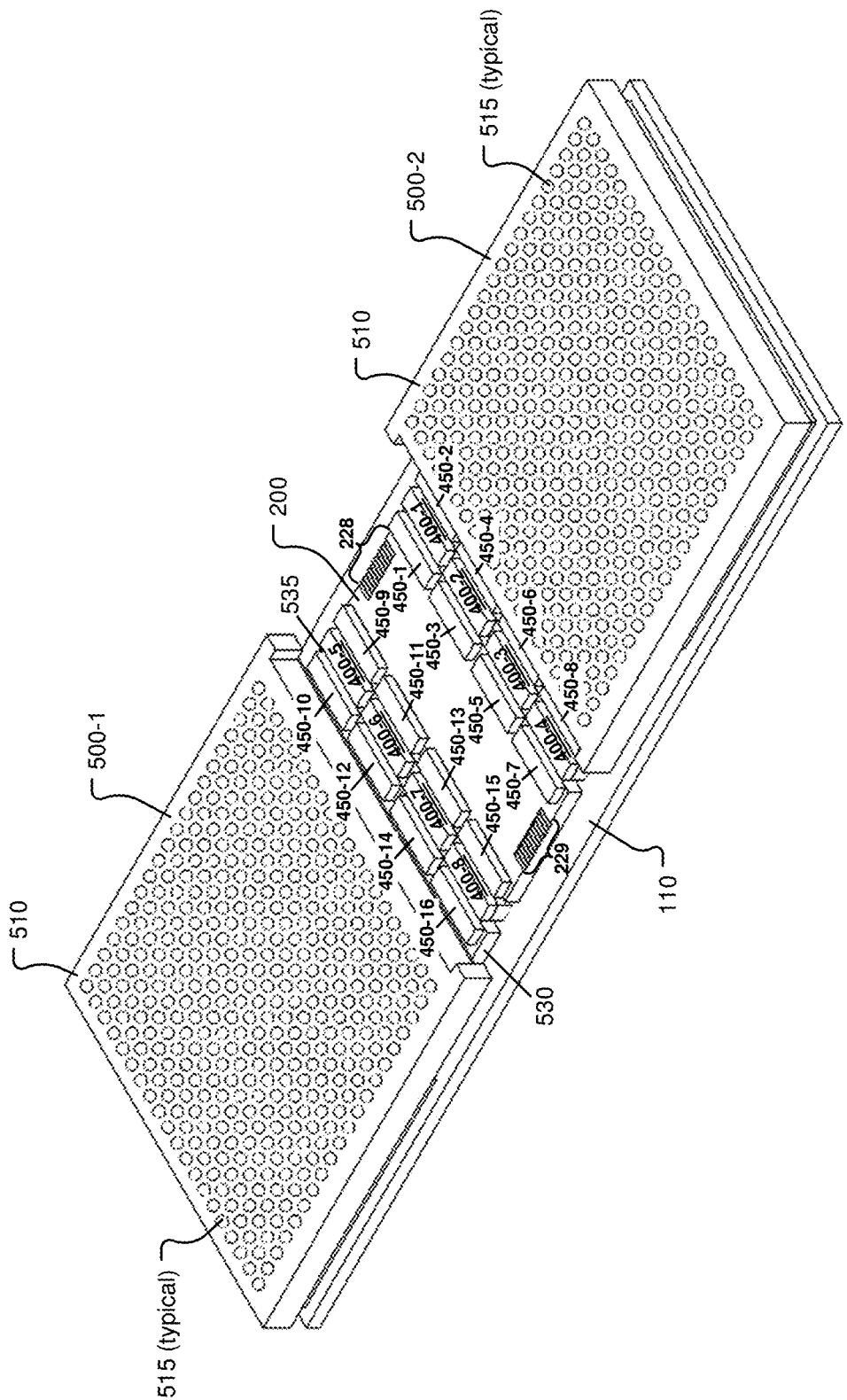
FIG. 11 shows the configuration of FIG. 10 with cover slips positioned over the optical fibers of the optical fiber jumpers within the optical fiber alignment structure arrays on the optical fiber shuffle and on the MCP's, in accordance with some embodiments.

FIG. 11 shows the configuration of FIG. 10 with cover slips 450-1 to 450-16 positioned over the optical fibers 410-1 to 410-12 of the optical fiber jumpers 400-1 to 400-8 within the optical fiber alignment structure arrays 220 to 227 on the optical fiber shuffle 200 and on the MCP's 500-1 and 500-2, in accordance with some embodiments. Specifically, the cover slip 450-1 is positioned over the optical fibers 410-1 to 410-12 of the optical fiber jumper 400-1 within the optical fiber alignment structure array 220 on the optical fiber shuffle 200. The cover slip 450-2 is positioned over the optical fibers 410-1 to 410-12 of the optical fiber jumper 400-1 within the optical fiber alignment structure array 531-2 on the chip 530 attached to the MCP 500-2. The cover slip 450-3 is positioned over the optical fibers 410-1 to 410-12 of the optical fiber jumper 400-2 within the optical fiber alignment structure array 221 on the optical fiber shuffle 200. The cover slip 450-4 is positioned over the optical fibers 410-1 to 410-12 of the optical fiber jumper 400-2 within the optical fiber alignment structure array 532-2 on the chip 530 attached to the MCP 500-2. The cover slip 450-5 is positioned over the optical fibers 410-1 to 410-12 of the optical fiber jumper 400-3 within the optical fiber alignment structure array 222 on the optical fiber shuffle 200. The cover slip 450-6 is positioned over the optical fibers 410-1 to 410-12 of the optical fiber jumper 400-3 within the optical fiber alignment structure array 536-2 on the chip 535 attached to the MCP 500-2. The cover slip 450-7 is positioned over the optical fibers 410-1 to 410-12 of the optical fiber jumper 400-4 within the optical fiber alignment structure array 223 on the optical fiber shuffle 200. The cover slip 450-8 is positioned over the optical fibers 410-1 to 410-12 of the optical fiber jumper 400-4 within the optical fiber alignment structure array 537-2 on the chip 535 attached to the MCP 500-2.

The cover slip 450-9 is positioned over the optical fibers 410-1 to 410-12 of the optical fiber jumper 400-5 within the optical fiber alignment structure array 224 on the optical fiber shuffle 200. The cover slip 450-10 is positioned over the optical fibers 410-1 to 410-12 of the optical fiber jumper 400-5 within the optical fiber alignment structure array 537 on the chip 535 attached to the MCP 500-1. The cover slip 450-11 is positioned over the optical fibers 410-1 to 410-12 of the optical fiber jumper 400-6 within the optical fiber alignment structure array 225 on the optical fiber shuffle 200. The cover slip 450-12 is positioned over the optical fibers 410-1 to 410-12 of the optical fiber jumper 400-6 within the optical fiber alignment structure array 536 on the chip 535 attached to the MCP 500-1. The cover slip 450-13 is positioned over the optical fibers 410-1 to 410-12 of the optical fiber jumper 400-7 within the optical fiber alignment structure array 226 on the optical fiber shuffle 200. The cover slip 450-14 is positioned over the optical fibers 410-1 to 410-12 of the optical fiber jumper 400-7 within the optical fiber alignment structure array 532 on the chip 530 attached to the MCP 500-1. The cover slip 450-15 is positioned over the optical fibers 410-1 to 410-12 of the optical fiber jumper 400-8 within the optical fiber alignment structure array 227 on the optical fiber shuffle 200. The cover slip 450-16 is positioned over the optical fibers 410-1 to 410-12 of the optical fiber jumper 400-8 within the optical fiber alignment structure array 531 on the chip 530 attached to the MCP 500-1.

In some embodiments, the cover slips 450-1 to 450-16 assist with securing of the optical fibers 410-1 to 410-12 within the optical fiber alignment structure arrays 220 to 227 on the optical fiber shuffle 200, and within the optical fiber alignment structure arrays 531 and 532 on the chip 530 of the MCP's 500-1 and 500-2, and within the optical fiber alignment structure arrays 536 and 537 on the chip 535 of the MCP's 500-1 and 500-2. In some embodiments, each of the cover slips 450-1 to 450-16 has essentially the same configuration. However, in some embodiments, one or more of the cover slips 450-1 to 450-16 has a different configuration as compared to another of the cover slips 450-1 to 450-16. Also, in some embodiments, the cover slips 450-1 to 450-16 are integrated (either as a component or functionally) within the corresponding optical fiber jumper 400-1 to 400-8. For example, in some embodiments, the cover slips 450-1 and 450-2 are integrated into the optical fiber jumper 400-1. For example, with reference to FIG. 3, in some embodiments the cover slip 420 extends over the optical fibers 410-1 to 410-12 in the direction of the width d3, such that the cover slips 450-1 and 450-2 and the cover slip 420 of the optical fiber jumper 400-1 are collectively formed as a single monolithic cover slip. Similarly, in some embodiments, the cover slips 450-3 and 450-4 and the cover slip 420 of the optical fiber jumper 400-2 are collectively formed as a single monolithic cover slip. In some embodiments, the cover slips 450-5 and 450-6 and the cover slip 420 of the optical fiber jumper 400-3 are collectively formed as a single monolithic cover slip. In some embodiments, the cover slips 450-7 and 450-8 and the cover slip 420 of the optical fiber jumper 400-4 are collectively formed as a single monolithic cover slip. In some embodiments, the cover slips 450-9 and 450-10 and the cover slip 420 of the optical fiber jumper 400-5 are collectively formed as a single monolithic cover slip. In some embodiments, the cover slips 450-11 and 450-12 and the cover slip 420 of the optical fiber jumper 400-6 are collectively formed as a single monolithic cover slip. In some embodiments, the cover slips 450-13 and 450-14 and the cover slip 420 of the optical fiber jumper 400-7 are collectively formed as a single monolithic cover slip. In some embodiments, the cover slips 450-15 and 450-16 and the cover slip 420 of the optical fiber jumper 400-8 are collectively formed as a single monolithic cover slip.

Figure 12:
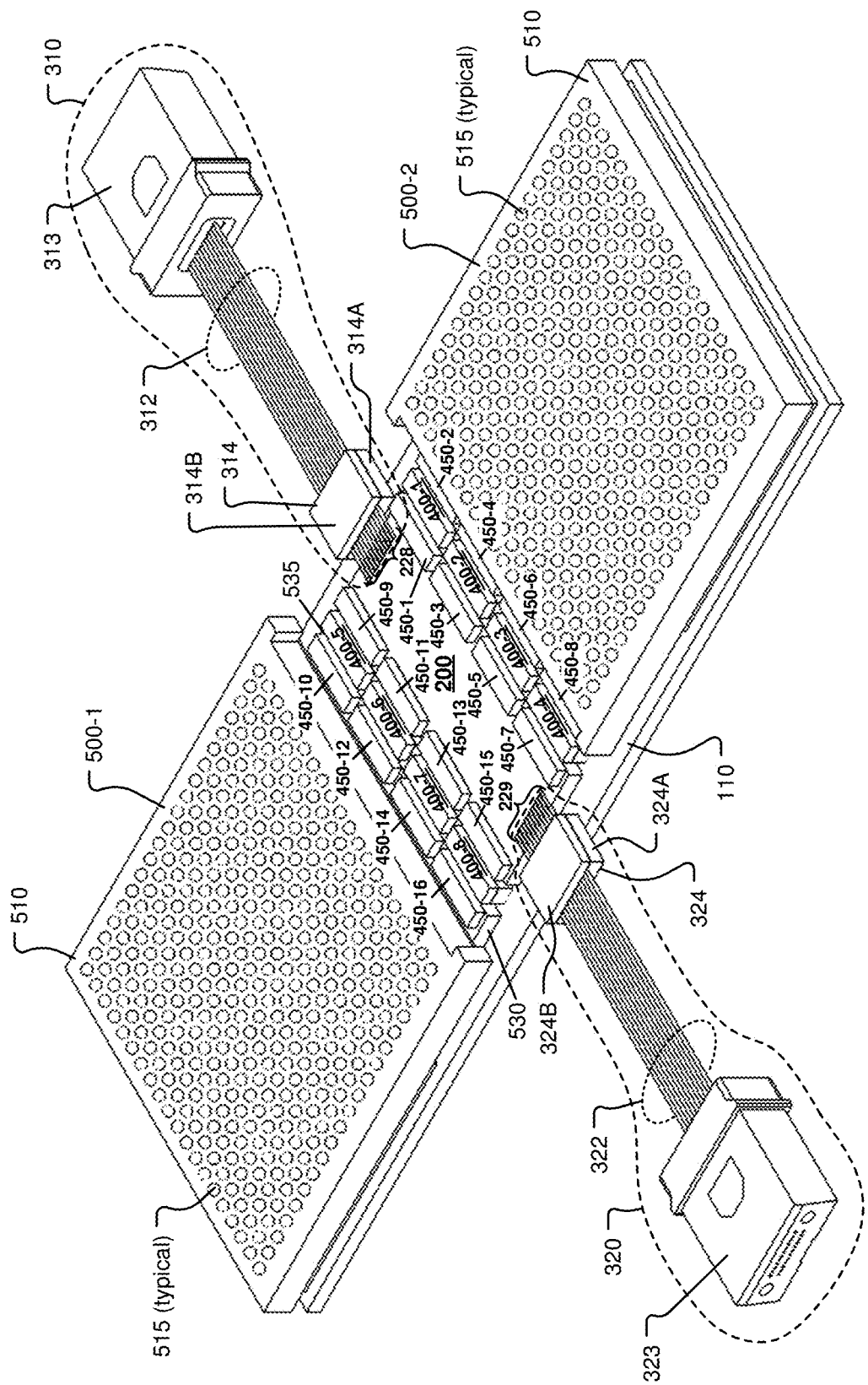
FIG. 12 shows the configuration of FIG. 11 with a connectorized fiber array positioned within and secured to an optical fiber alignment structure array on the optical fiber shuffle, and with another connectorized fiber array positioned within and secured to another optical fiber alignment structure array on the optical fiber shuffle, in accordance with some embodiments.

FIG. 12 shows the configuration of FIG. 11 with a connectorized fiber array 310 positioned within and secured to the optical fiber alignment structure array 228 on the optical fiber shuffle 200, and with a connectorized fiber array 320 positioned within and secured to the optical fiber alignment structure array 229 on the optical fiber shuffle 200, in accordance with some embodiments. The connectorized fiber array 310 includes a plurality of optical fibers 312, a connector 313, and an optical fiber alignment block 314. In some embodiments, the optical fiber alignment block 314 is formed in a manner similar to the optical fiber alignment structure array 430 and cover slip 420 of the optical fiber jumper 400. For example, in some embodiments, the optical fiber alignment block 314 includes an optical fiber alignment structure array 314A and a cover slip 314B, where the optical fiber alignment structure array 314A is configured similar to the optical fiber alignment structure array 430 and where the cover slip 314B is configured similar to the cover slip 420. The connectorized fiber array 320 includes a plurality of optical fibers 322, a connector 323, and an optical fiber alignment block 324. In some embodiments, the optical fiber alignment block 324 is formed in a manner similar to the optical fiber alignment structure array 430 and cover slip 420 of the optical fiber jumper 400. For example, in some embodiments, the optical fiber alignment block 324 includes an optical fiber alignment structure array 324A and a cover slip 324B, where the optical fiber alignment structure array 324A is configured similar to the optical fiber alignment structure array 430 and where the cover slip 324B is configured similar to the cover slip 420.

As previously discussed with regard to FIG. 4D, in some embodiments, rather than using the optical fiber alignment structure arrays 228 and/or 229, the corresponding edge of the optical fiber shuffle 200 exposes optical waveguides 236 to create an optical connector for connection of the optical fiber shuffle 200 to the connectorized fiber arrays 310 and/or 320. For example, in some embodiments, an edge of the optical fiber shuffle 200 is sandwiched between a top half and a bottom half of an MT ferrule, with the optical waveguides 236 exposed at the edge of the optical fiber shuffle 200 positioned between the top half and the bottom half of the MT ferrule. The MT ferrule is then used to connect to the connectorized fiber array 310, 320.

Figure 13:
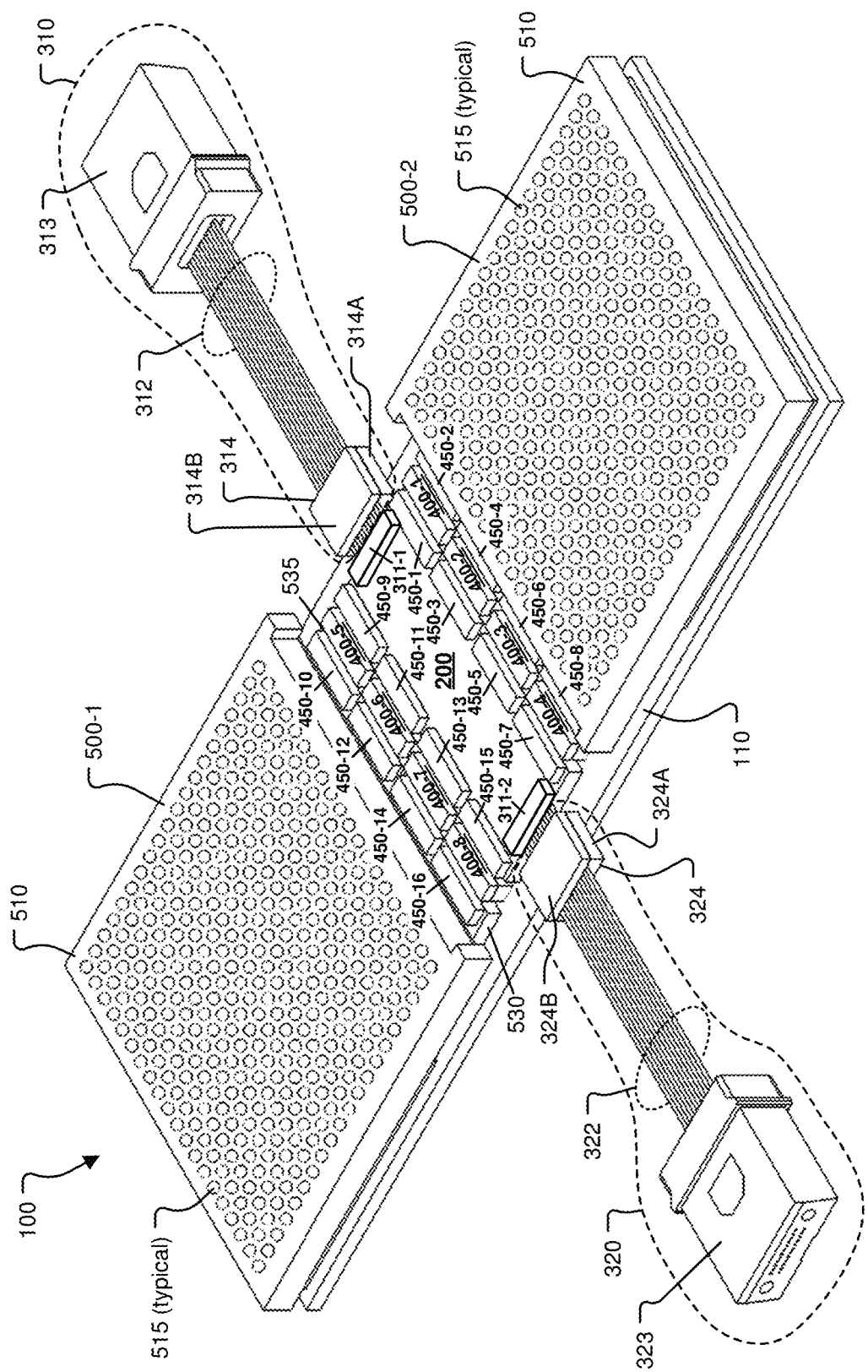
FIG. 13 shows the configuration of FIG. 12 with cover slips positioned over the optical fibers of the connectorized fiber arrays within the corresponding optical fiber alignment structure arrays on the optical fiber shuffle, in accordance with some embodiments.

FIG. 13 shows the configuration of FIG. 12 with cover slips 311-1 and 311-2 positioned over the optical fibers 312 and 322, respectively, of the connectorized fiber arrays 310 and 320, respectively, within the corresponding optical fiber alignment structure arrays 228 and 229, respectively, on the optical fiber shuffle 200, in accordance with some embodiments. In some embodiments, the cover slip 311-1 assists with securing/adhesion of the optical fibers 312 of the connectorized fiber array 310 within the optical fiber alignment structure array 228 on the optical fiber shuffle 200. In some embodiments, the cover slip 311-2 assists with securing/adhesion of the optical fibers 322 of the connectorized fiber array 320 within the optical fiber alignment structure array 229 on the optical fiber shuffle 200. The configuration of FIG. 13 represents the multi-MCP module assembly 100 with integrated optical fiber shuffle 200.

Figure 14A:
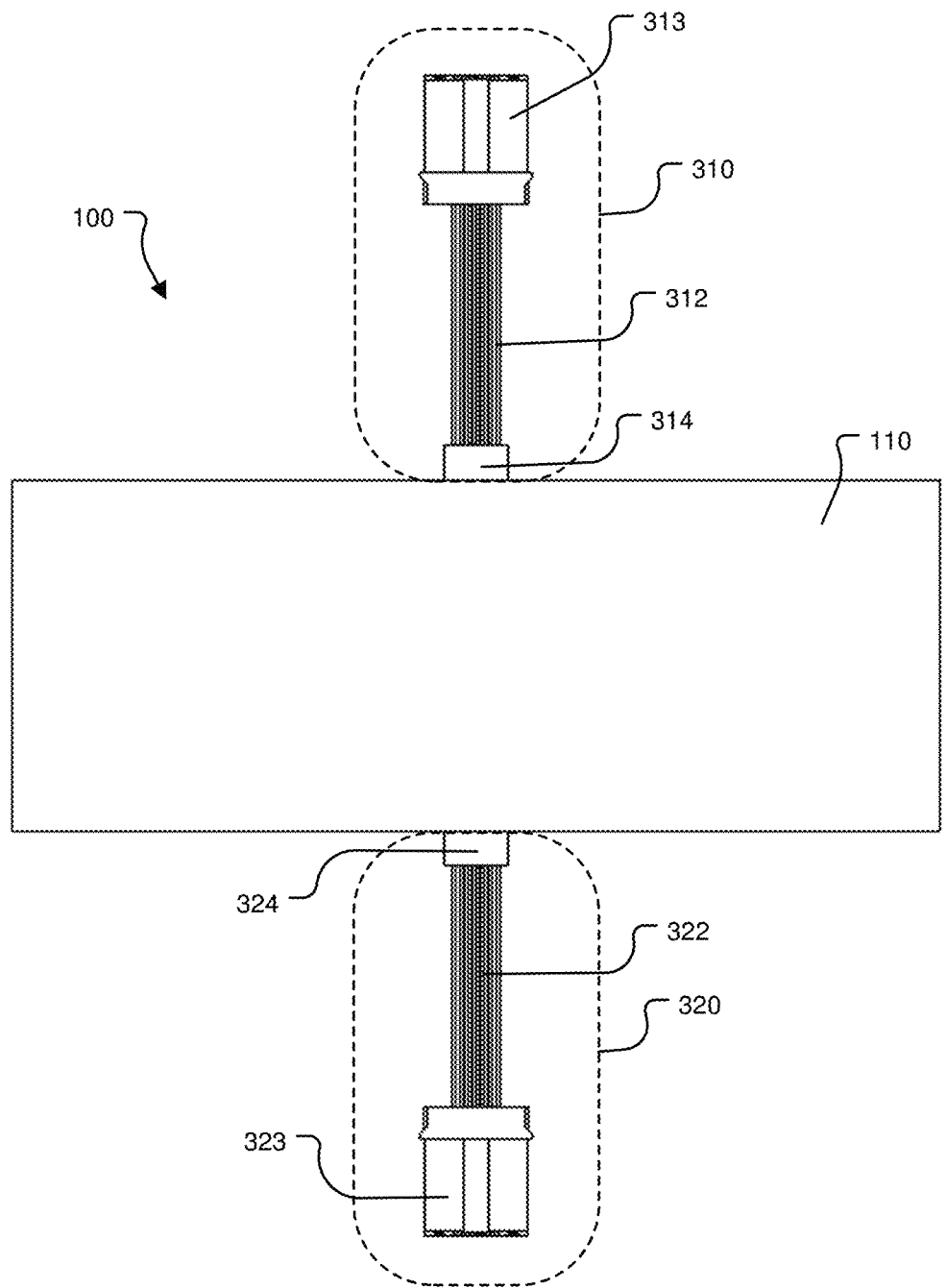
FIG. 14A shows a top view of the multi-MCP module assembly, in accordance with some embodiments.
Figure 14B:
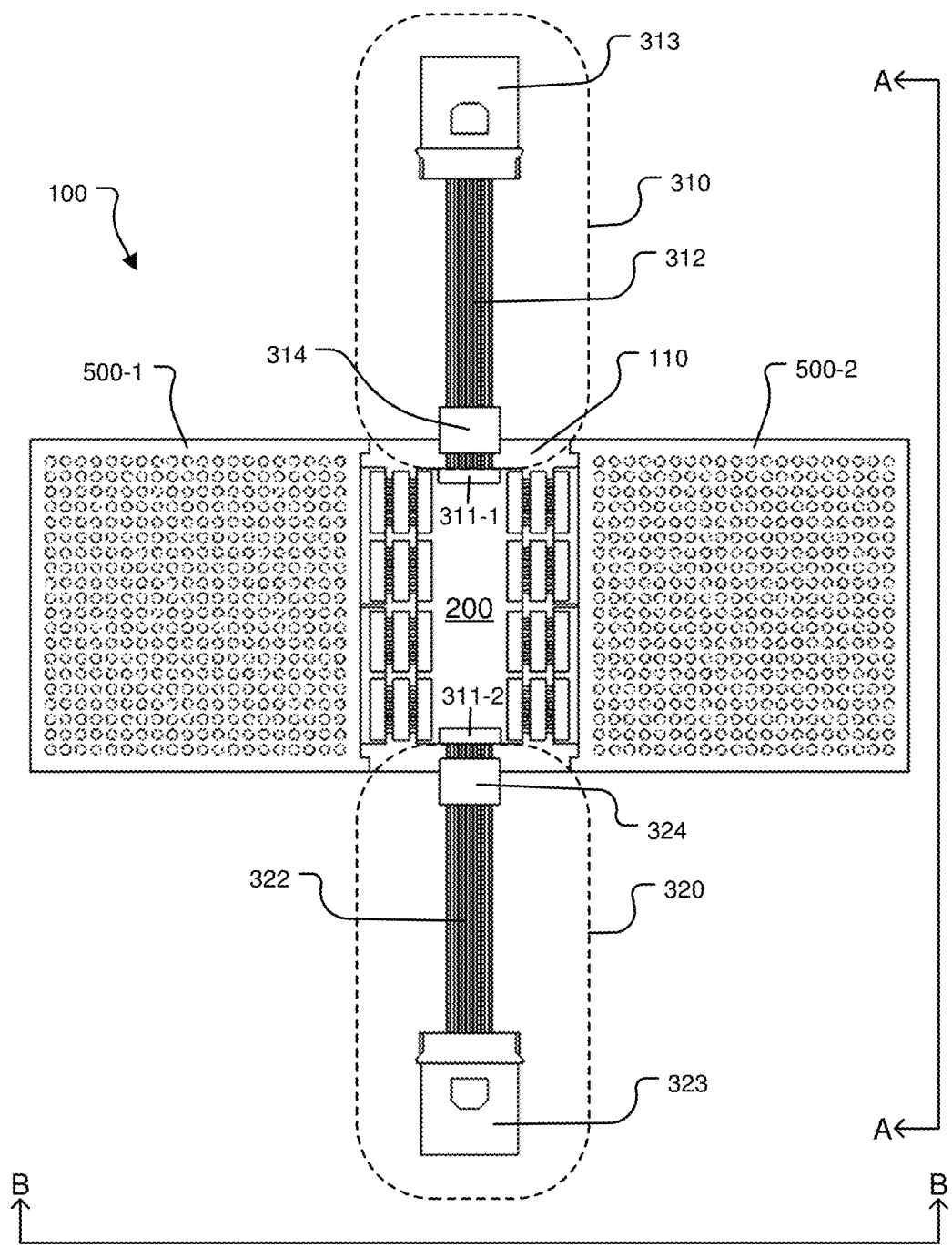
FIG. 14B shows a bottom view of the multi-MCP module assembly, in accordance with some embodiments.

FIG. 14A shows a top view of the multi-MCP module assembly 100, in accordance with some embodiments. FIG. 14B shows a bottom view of the multi-MCP module assembly 100, in accordance with some embodiments. FIG. 14C shows a side view of the multi-MCP module assembly 100, referenced as View A-A in FIG. 14B, in accordance with some embodiments. FIG. 14D shows an end view of the multi-MCP module assembly 100, referenced as View B-B in FIG. 14B, in accordance with some embodiments.

The integrated optical fiber shuffle 200 eliminates the need for having an external optical fiber shuffle. Therefore, the multi-MCP module assembly 100 implemented using the integrated optical fiber shuffle 200 is more space efficient and is less expensive, as compared to a multi-MCP module assembly implemented using an external optical fiber shuffle. More specifically, the integrated optical fiber shuffle 200 provides for an overall reduction in cost of the multi-MCP module assembly, as compared to what is achievable using the external optical fiber shuffle, because the optical fiber jumpers 400 cost less than corresponding MT ferrules that are replaced by the optical fiber jumpers 400. Also, because the optical fiber jumper 400 provides for a more optically efficient optical connection than an MT ferrule, use of the optical fiber jumpers 400 with the integrated optical fiber shuffle 200 provides for a reduction in optical power loss within the multi-MCP module assembly 100 as compared to implementation of the multi-MCP module assembly 100 using an external optical fiber shuffle with MT ferrules.

Figure 15:
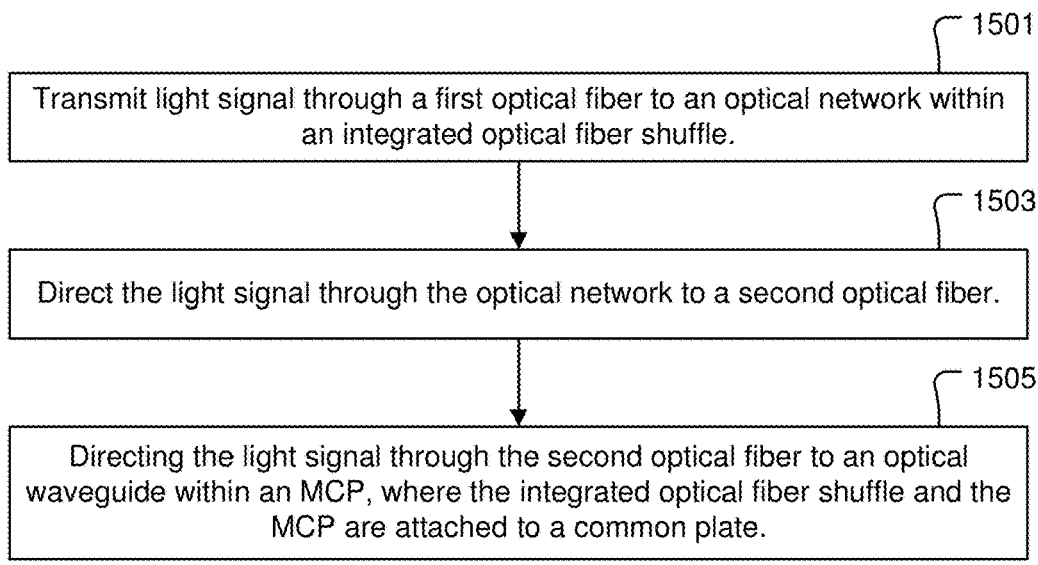
FIG. 15 shows a flowchart of a method for optical data communication using a multi-MCP module assembly, in accordance with some embodiments.

FIG. 15 shows a flowchart of a method for optical data communication using a multi-MCP module assembly (e.g., 100), in accordance with some embodiments. The method includes an operation 1501 in which a light signal is transmitted through a first optical fiber (e.g., 410-1 to 410-12, 312, 322) to an optical network (e.g., 230) within an integrated optical fiber shuffle (e.g., 200). The method also includes an operation 1503 in which the light signal is directed through the optical network to a second optical fiber (e.g., 410-1 to 410-12, 312, 322). The method also includes an operation 1505 in which the light signal is directed through the second optical fiber to an optical waveguide within an MCP (e.g., 500-1, 500-2), where the integrated optical fiber shuffle and the MCP are attached to a common plate (e.g., 110).

Figure 16:
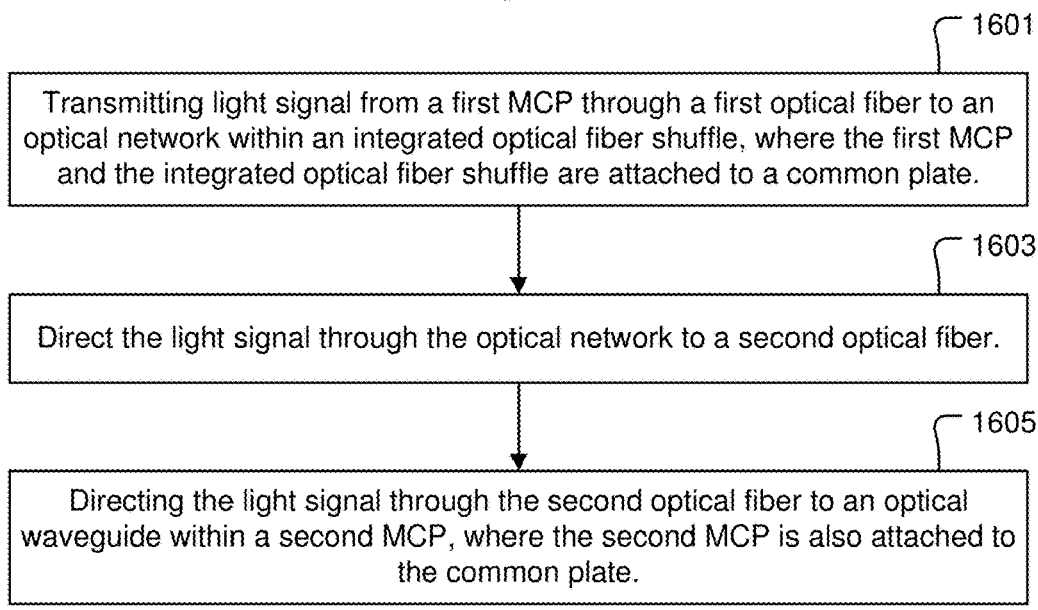
FIG. 16 shows a flowchart of a method for optical data communication using a multi-MCP module assembly, in accordance with some embodiments.

FIG. 16 shows a flowchart of a method for optical data communication using a multi-MCP module assembly (e.g., 100), in accordance with some embodiments. The method includes an operation 1601 in which a light signal is transmitted from a first MCP (e.g., 500-1) through a first optical fiber (e.g., 410-1 to 410-12) to an optical network (e.g., 230) within an integrated optical fiber shuffle (e.g., 200), where the first MCP and the integrated optical fiber shuffle are attached to a common plate (e.g., 110). The method also includes an operation 1603 in which the light signal is directed through the optical network to a second optical fiber (e.g., 410-1 to 410-12). The method also includes an operation 1605 in which the light signal is directed through the second optical fiber to an optical waveguide within a second MCP (e.g., 500-2), where the second MCP is also attached to the common plate.

Figure 17:
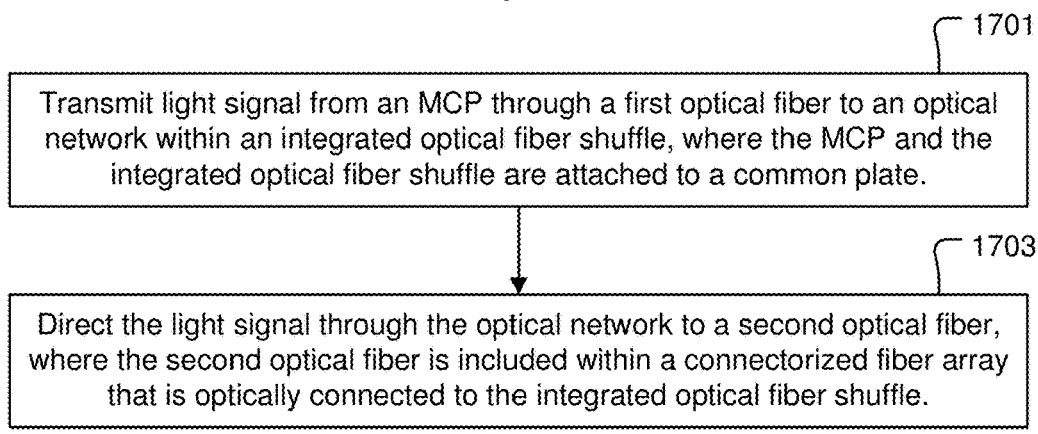
FIG. 17 shows a flowchart of a method for optical data communication using a multi-MCP module assembly, in accordance with some embodiments.

FIG. 17 shows a flowchart of a method for optical data communication using a multi-MCP module assembly (e.g., 100), in accordance with some embodiments. The method includes an operation 1701 in which a light signal is transmitted from an MCP (e.g., 500-1 or 500-2) through a first optical fiber (e.g., 410-1 to 410-12) to an optical network (e.g., 230) within an integrated optical fiber shuffle (e.g., 200), where the MCP and the integrated optical fiber shuffle are attached to a common plate (e.g., 110). The method also includes an operation 1703 in which the light signal is directed through the optical network to a second optical fiber (e.g., 312, 322), where the second optical fiber is included within a connectorized fiber array (e.g., 310, 320) that is optically connected to the integrated optical fiber shuffle.

The foregoing description of the embodiments has been provided for purposes of illustration and description, and is not intended to be exhaustive or limiting. Individual elements or features of a particular embodiment are generally not limited to that particular embodiment, but, where applicable, are interchangeable and can be used in a selected embodiment, even if not specifically shown or described. In this manner, one or more features from one or more embodiments disclosed herein can be combined with one or more features from one or more other embodiments disclosed herein to form another embodiment that is not explicitly disclosed herein, but rather that is implicitly disclosed herein. This other embodiment may also be varied in many ways. Such embodiment variations are not to be regarded as a departure from the disclosure herein, and all such embodiment variations and modifications are intended to be included within the scope of the disclosure provided herein.

Although some method operations may be described in a specific order herein, it should be understood that other housekeeping operations may be performed in between method operations, and/or method operations may be adjusted so that they occur at slightly different times or simultaneously or may be distributed in a system which allows the occurrence of the processing operations at various intervals associated with the processing, as long as the processing of the method operations are performed in a manner that provides for successful implementation of the method.

Although the foregoing embodiments have been described in some detail for purposes of clarity of understanding, it will be apparent that certain changes and modifications can be practiced within the scope of the appended claims. Accordingly, the embodiments disclosed herein are to be considered as illustrative and not restrictive, and are therefore not to be limited to just the details given herein, but may be modified within the scope and equivalents of the appended claims.

What is claimed is:

1. A multi-MCP (multi-chip package) module assembly, comprising:
    a plate;
    an integrated optical fiber shuffle disposed on the plate, the integrated optical fiber shuffle formed as a planar structure including an optical network;
    a first MCP disposed on the plate;
    a second MCP disposed on the plate;
    a first optical fiber jumper disposed on the plate, the first optical fiber jumper optically connecting the first MCP to the integrated optical fiber shuffle; and
    a second optical fiber jumper disposed on the plate, the second optical fiber jumper optically connecting the second MCP to the integrated optical fiber shuffle,
    wherein the optical network of the integrated optical fiber shuffle is configured to route light signals to and from each of the first MCP and the second MCP,
    wherein the integrated optical fiber shuffle includes a first optical fiber alignment structure array and a second optical fiber alignment structure array, and wherein the first MCP includes a third optical fiber alignment structure array, and wherein the second MCP includes a fourth optical fiber alignment structure array,
    wherein the first optical fiber jumper includes a first plurality of optical fibers, wherein each optical fiber of the first plurality of optical fibers is positioned in both the first optical fiber alignment structure array and the third optical fiber alignment structure array, and wherein the second optical fiber jumper includes a second plurality of optical fibers, wherein each optical fiber of the second plurality of optical fibers is positioned in both the second optical fiber alignment structure array and the fourth optical fiber alignment structure array.

2. The multi-MCP module assembly as recited in claim 1, wherein the plate is formed of a material that has a thermal conductivity greater than or equal to about 0.1 Watt/(centimeter-° C.).

3. The multi-MCP module assembly as recited in claim 1, wherein the plate includes a first fiducial to which the integrated optical fiber shuffle is aligned and a second fiducial to which the first MCP is aligned and a third fiducial to which the second MCP is aligned.

4. The multi-MCP module assembly as recited in claim 1, wherein the first optical fiber alignment structure array is a first array of v-groove structures formed along a periphery of the integrated optical fiber shuffle, wherein the second optical fiber alignment structure array is a second array of v-groove structures formed along the periphery of the integrated optical fiber shuffle, wherein the third optical fiber alignment structure array is a third array of v-groove structures formed along an edge of the first MCP, and wherein the fourth optical fiber alignment structure array is a fourth array of v-groove structures formed along an edge of the second MCP.

5. The multi-MCP module assembly as recited in claim 1, wherein the first optical fiber alignment structure array is positioned at a first peripheral edge of the integrated optical fiber shuffle, wherein the second optical fiber alignment structure array is positioned at a second peripheral edge of the integrated optical fiber shuffle.

6. The multi-MCP module assembly as recited in claim 5, wherein the first and second peripheral edges of the integrated optical fiber shuffle are on opposite sides of the integrated optical fiber shuffle.

7. The multi-MCP module assembly as recited in claim 1, further comprising:
    a connectorized fiber array optically connected to the integrated optical fiber shuffle.

8. The multi-MCP module assembly as recited in claim 7, wherein the integrated optical fiber shuffle includes a fifth optical fiber alignment structure array, wherein the connectorized fiber array includes a third plurality of optical fibers positioned in the fifth optical fiber alignment structure array.

9. The multi-MCP module assembly as recited in claim 8, wherein the first optical fiber alignment structure array is positioned at a first peripheral edge of the integrated optical fiber shuffle, wherein the second optical fiber alignment structure array is positioned at a second peripheral edge of the integrated optical fiber shuffle, and wherein the fifth optical fiber alignment structure array is positioned at a third peripheral edge of the integrated optical fiber shuffle.

10. The multi-MCP module assembly as recited in claim 9, wherein the third peripheral edge of the integrated optical fiber shuffle is located between the first and second peripheral edges of the integrated optical fiber shuffle.

11. The multi-MCP module assembly as recited in claim 10, wherein the first and second peripheral edges of the integrated optical fiber shuffle are on opposite sides of the integrated optical fiber shuffle.

12. The multi-MCP module assembly as recited in claim 11, wherein the third peripheral edge of the integrated optical fiber shuffle is positioned next to an edge of the plate.

13. The multi-MCP module assembly as recited in claim 12, wherein each of the first, second, and fifth optical fiber alignment structure arrays is a respective array of v-groove structures formed along a periphery of the integrated optical fiber shuffle, wherein the third optical fiber alignment structure array is an array of v-groove structures formed along an edge of the first MCP, and wherein the fourth optical fiber alignment structure array is another array of v-groove structures formed along an edge of the second MCP.

14. The multi-MCP module assembly as recited in claim 13, further comprising:
a first cover slip attached to the integrated optical fiber shuffle, the first cover slip configured to cover a first portion of the first plurality of optical fibers positioned in the first optical fiber alignment structure array;
a second cover slip attached to the integrated optical fiber shuffle, the second cover slip configured to cover a second portion of the first plurality of optical fibers positioned in the third optical fiber alignment structure array;
a third cover slip attached to the integrated optical fiber shuffle, the third cover slip configured to cover a first portion of the second plurality of optical fibers positioned in the second optical fiber alignment structure array;
a fourth cover slip attached to the integrated optical fiber shuffle, the fourth cover slip configured to cover a second portion of the second plurality of optical fibers positioned in the fourth optical fiber alignment structure array; and
a fifth cover slip attached to the integrated optical fiber shuffle, the fifth cover slip configured to cover a portion of the third plurality of optical fibers positioned in the fifth optical fiber alignment structure array.

15. The multi-MCP module assembly as recited in claim 1, further comprising:
a connectorized fiber array optically connected to the integrated optical fiber shuffle.

16. The multi-MCP module assembly as recited in claim 15, wherein the integrated optical fiber shuffle includes an optical fiber alignment structure array, wherein the connectorized fiber array includes a plurality of optical fibers positioned in the optical fiber alignment structure array.

17. The multi-MCP module assembly as recited in claim 1, wherein the optical network of the integrated optical fiber shuffle includes optical waveguides formed within the planar structure of the integrated optical fiber shuffle.

18. The multi-MCP module assembly as recited in claim 17, wherein the optical network is configured to route light signals between the first MCP and the second MCP.

* * * * *